(12) United States Patent
Adefris

(10) Patent No.: US 11,634,618 B2
(45) Date of Patent: Apr. 25, 2023

(54) ABRASIVE PARTICLES, METHOD OF MAKING ABRASIVE PARTICLES, AND ABRASIVE ARTICLES

(71) Applicant: 3M INNOVATIVE PROPERTIES COMPANY, St. Paul, MN (US)

(72) Inventor: Negus B. Adefris, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 947 days.

(21) Appl. No.: 16/376,348

(22) Filed: Apr. 5, 2019

(65) Prior Publication Data

US 2019/0233694 A1 Aug. 1, 2019

Related U.S. Application Data

(62) Division of application No. 15/673,685, filed on Aug. 10, 2017, now Pat. No. 10,301,518, which is a
(Continued)

(51) Int. Cl.
*B24D 18/00* (2006.01)
*B24D 11/00* (2006.01)
(Continued)

(52) U.S. Cl.
CPC .............. *C09K 3/1409* (2013.01); *B24D 3/14* (2013.01); *B24D 11/00* (2013.01);
(Continued)

(58) Field of Classification Search
CPC . B24D 3/02; B24D 3/00; B24D 11/00; B24D 18/00; B24D 3/14; C09K 3/14;
(Continued)

(56) References Cited

U.S. PATENT DOCUMENTS

| 1,910,444 A | 5/1933 | Nicholson |
| 2,958,593 A | 11/1960 | Hoover |

(Continued)

FOREIGN PATENT DOCUMENTS

| CA | 743715 | 10/1966 |
| CN | 1053571 A | 8/1991 |

(Continued)

OTHER PUBLICATIONS

Partial Supplementary European Search Report, EP13772568.5, dated Oct. 15, 2015, 3 pages.

(Continued)

*Primary Examiner* — James E Mcdonough
(74) *Attorney, Agent, or Firm* — Aleksander Medved

(57) ABSTRACT

Shaped ceramic abrasive particles include a first surface having a perimeter having a perimeter comprising at least first and second edges. A first region of the perimeter includes the second edge and extends inwardly and terminates at two corners defining first and second acute interior angles. The perimeter has at most four corners that define acute interior angles. A second surface is disposed opposite, and not contacting, the first surface. A peripheral surface is disposed between and connects the first and second surfaces. The peripheral surface has a first predetermined shape. Methods of making the shaped ceramic abrasive particles, and abrasive articles including them are also disclosed.

13 Claims, 12 Drawing Sheets

Related U.S. Application Data division of application No. 14/389,976, filed as application No. PCT/US2013/031972 on Mar. 15, 2013, now Pat. No. 9,771,504.

(60) Provisional application No. 61/620,224, filed on Apr. 4, 2012.

(51) Int. Cl.
| | |
|---|---|
| *B24D 3/14* | (2006.01) |
| *C09K 3/14* | (2006.01) |
| *C04B 35/111* | (2006.01) |
| *C04B 35/628* | (2006.01) |
| *B24D 3/02* | (2006.01) |
| *B24D 3/00* | (2006.01) |

(52) U.S. Cl.
CPC .... *C04B 35/1115* (2013.01); *C04B 35/62815* (2013.01); *C04B 35/62886* (2013.01); *C04B 2235/3206* (2013.01); *C04B 2235/3218* (2013.01); *C04B 2235/3225* (2013.01); *C04B 2235/3227* (2013.01); *C04B 2235/3275* (2013.01); *C04B 2235/602* (2013.01); *C04B 2235/72* (2013.01); *C04B 2235/94* (2013.01)

(58) Field of Classification Search
CPC .............. C09K 3/1409; C04B 35/1115; C04B 35/62815; C04B 35/62886; C04B 2235/3206; C04B 2235/3218; C04B 2235/3225; C04B 2235/72; C04B 2235/94
USPC .......................................... 51/293, 307, 309
See application file for complete search history.

(56) References Cited

U.S. PATENT DOCUMENTS

| | | |
|---|---|---|
| 3,041,156 A | 6/1962 | Rowse |
| 3,079,243 A | 2/1963 | Ueltz |
| 3,387,957 A | 6/1968 | Howard |
| 3,481,723 A | 12/1969 | Kistler |
| 3,608,050 A | 9/1971 | Carman |
| 3,874,856 A | 4/1975 | Leeds |
| 3,909,991 A | 10/1975 | Coes, Jr. |
| 4,150,078 A | 4/1979 | Miller |
| 4,314,827 A | 2/1982 | Leitheiser |
| 4,518,397 A | 5/1985 | Leitheiser |
| 4,543,107 A | 9/1985 | Rue |
| 4,588,419 A | 5/1986 | Caul |
| 4,623,364 A | 11/1986 | Cottringer |
| 4,737,163 A | 4/1988 | Larkey |
| 4,734,104 A | 5/1988 | Broberg |
| 4,741,743 A | 5/1988 | Narayanan |
| 4,744,802 A | 5/1988 | Schwabel |
| 4,751,138 A | 6/1988 | Tumey |
| 4,770,671 A | 9/1988 | Monroe |
| 4,800,685 A | 1/1989 | Haynes, Jr. |
| 4,848,041 A | 6/1989 | Kruschke |
| 4,881,951 A | 11/1989 | Wood |
| 4,898,597 A | 2/1990 | Hay |
| 4,954,462 A | 9/1990 | Wood |
| 4,960,441 A | 10/1990 | Pellow |
| 4,997,461 A | 3/1991 | Markhoff-Matheny |
| 5,009,675 A | 4/1991 | Kunz |
| 5,009,676 A | 4/1991 | Rue |
| 5,011,508 A | 4/1991 | Wald |
| 5,035,723 A | 7/1991 | Kalinowski |
| 5,037,453 A | 8/1991 | Narayanan |
| 5,042,991 A | 8/1991 | Kunz |
| 5,049,166 A | 9/1991 | Kirkendall |
| 5,085,671 A | 2/1992 | Martin |
| 5,090,968 A | 2/1992 | Pellow |
| 5,094,672 A | 3/1992 | Giles, Jr. |
| 5,110,332 A | 5/1992 | Isaksson |
| 5,118,326 A | 6/1992 | Lee |
| 5,131,926 A | 6/1992 | Rostoker |
| 5,139,978 A | 8/1992 | Wood |
| 5,152,917 A | 10/1992 | Pieper |
| 5,164,348 A | 11/1992 | Wood |
| 5,201,916 A | 4/1993 | Berg |
| 5,203,884 A | 4/1993 | Buchanan |
| 5,203,886 A | 4/1993 | Sheldon |
| 5,213,591 A | 5/1993 | Celikkaya |
| 5,282,875 A | 2/1994 | Wood |
| 5,304,331 A | 4/1994 | Leonard |
| 5,312,791 A | 5/1994 | Coblenz |
| 5,352,254 A | 10/1994 | Celikkaya |
| 5,366,523 A | 11/1994 | Rowenhorst |
| 5,378,251 A | 1/1995 | Culler |
| 5,409,645 A | 4/1995 | Torre, Jr. |
| 5,417,726 A | 5/1995 | Stout |
| 5,427,595 A | 6/1995 | Pihl |
| 5,429,647 A | 7/1995 | Larmie |
| 5,431,967 A | 7/1995 | Manthiram |
| 5,435,816 A | 7/1995 | Spurgeon |
| 5,436,063 A | 7/1995 | Follett |
| 5,443,603 A | 8/1995 | Kirkendall |
| 5,443,906 A | 8/1995 | Pihl |
| 5,496,386 A | 3/1996 | Broberg |
| 5,498,269 A | 3/1996 | Larmie |
| 5,520,711 A | 5/1996 | Helmim |
| 5,547,479 A | 8/1996 | Conwell |
| 5,551,963 A | 9/1996 | Larmie |
| 5,584,896 A | 12/1996 | Broberg |
| 5,609,706 A | 3/1997 | Benedict |
| RE35,570 E | 7/1997 | Rowenhorst |
| 5,672,097 A | 9/1997 | Hoopman |
| 5,679,067 A | 10/1997 | Johnson |
| 5,725,162 A | 3/1998 | Garg |
| 5,738,696 A | 4/1998 | Wu |
| 5,776,214 A | 7/1998 | Wood |
| 5,779,743 A | 7/1998 | Wood |
| 5,863,308 A | 1/1999 | Qi |
| 5,893,935 A | 4/1999 | Wood |
| 5,903,951 A | 5/1999 | Ionta |
| 5,908,478 A | 6/1999 | Wood |
| 5,946,991 A | 9/1999 | Law |
| 5,954,844 A | 9/1999 | Law |
| 5,961,674 A | 10/1999 | Gagliardi |
| 5,975,987 A | 11/1999 | Hoopman |
| 5,975,988 A | 11/1999 | Christianson |
| 5,984,988 A | 11/1999 | Berg |
| 6,019,805 A | 2/2000 | Herron |
| 6,053,956 A | 4/2000 | Wood |
| 6,054,093 A | 4/2000 | Torre, Jr. |
| 6,080,215 A | 6/2000 | Stubbs |
| 6,080,216 A | 6/2000 | Erickson |
| 6,129,540 A | 10/2000 | Hoopman |
| 6,206,942 B1 | 3/2001 | Wood |
| 6,228,134 B1 | 5/2001 | Erickson |
| 6,277,161 B1 | 8/2001 | Castro |
| 6,544,307 B2 | 4/2003 | Shimamoto |
| 6,702,650 B2 | 3/2004 | Adefris |
| 6,790,126 B2 | 9/2004 | Wood |
| 6,881,483 B2 | 4/2005 | McArdle |
| 7,524,345 B2 | 4/2009 | Nevoret |
| 7,867,302 B2 | 1/2011 | Nevoret |
| 7,875,091 B2 | 1/2011 | Nevoret |
| 8,034,137 B2 | 10/2011 | Erickson |
| 8,123,828 B2 | 2/2012 | Culler |
| 8,142,531 B2 | 3/2012 | Adefris |
| 8,142,532 B2 | 3/2012 | Erickson |
| 8,142,891 B2 | 3/2012 | Culler |
| 8,480,772 B2 | 7/2013 | Welygan |
| 8,551,577 B2 | 10/2013 | Moren |
| 8,764,865 B2 | 7/2014 | Boden |
| 8,765,327 B2 | 7/2014 | Haug |
| 2001/0027623 A1 | 10/2001 | Rosenflanz |
| 2004/0003895 A1 | 1/2004 | Amano |
| 2004/0018802 A1 | 1/2004 | Welygan |
| 2004/0148967 A1 | 8/2004 | Celikkaya |
| 2004/0244675 A1 | 12/2004 | Kishimoto |

(56) References Cited

U.S. PATENT DOCUMENTS

| | | | |
|---|---|---|---|
| 2005/0060947 A1 | 3/2005 | McArdle | |
| 2005/0132655 A1 | 6/2005 | Anderson | |
| 2005/0232853 A1 | 10/2005 | Evans | |
| 2006/0185256 A1 | 8/2006 | Nevoret | |
| 2007/0020457 A1 | 1/2007 | Adefris | |
| 2007/0072527 A1 | 3/2007 | Palmgren | |
| 2008/0172951 A1 | 7/2008 | Starling | |
| 2008/0299875 A1 | 12/2008 | Duescher | |
| 2009/0120009 A1 | 5/2009 | Sung | |
| 2009/0165394 A1 | 7/2009 | Culler | |
| 2009/0169816 A1 | 7/2009 | Erickson | |
| 2010/0003904 A1 | 1/2010 | Duescher | |
| 2010/0146867 A1 | 6/2010 | Boden | |
| 2010/0151195 A1 | 6/2010 | Culler | |
| 2010/0151196 A1 | 6/2010 | Adefris | |
| 2010/0151201 A1 | 6/2010 | Erickson | |
| 2010/0319269 A1* | 12/2010 | Erickson | C04B 35/62815 428/402 |
| 2011/0146509 A1 | 6/2011 | Welygan | |
| 2012/0227333 A1* | 9/2012 | Adefris | B24D 11/00 451/526 |
| 2015/0210910 A1 | 6/2015 | Hejtmann et al. | |

FOREIGN PATENT DOCUMENTS

| | | |
|---|---|---|
| CN | 1138839 A | 12/1996 |
| CN | 1291126 A | 4/2001 |
| CN | 1938129 A | 3/2007 |
| CN | 102281992 A | 12/2011 |
| CN | 102281993 A | 12/2011 |
| CN | 102317038 A | 1/2012 |
| GB | 965231 | 7/1964 |
| GB | 986847 | 3/1965 |
| JP | 60-6356 | 1/1985 |
| JP | H07-509508 A | 10/1995 |
| JP | 2014-517045 A | 7/2014 |
| JP | 2015-508444 A | 3/2015 |
| RU | 2303621 | 6/2005 |
| WO | WO 1995-18192 | 7/1995 |
| WO | WO 1999-38817 | 8/1999 |
| WO | WO 2001-14494 | 3/2001 |
| WO | WO 2010-077519 A2 | 7/2010 |
| WO | WO 2011-068714 | 6/2011 |
| WO | WO 2011-068724 | 6/2011 |
| WO | WO 2011/087739 | 7/2011 |
| WO | WO 2011-109188 | 9/2011 |
| WO | WO 2011-139562 | 11/2011 |
| WO | WO 2012-018903 | 2/2012 |
| WO | WO 2012-061016 | 5/2012 |
| WO | WO 2012-061033 | 5/2012 |
| WO | WO 2012/092590 | 7/2012 |
| WO | WO 2012-112305 | 8/2012 |
| WO | WO 2012-112322 | 8/2012 |
| WO | WO 2012-141905 | 10/2012 |
| WO | WO 2013-009484 | 1/2013 |
| WO | WO 2013-036402 | 3/2013 |
| WO | WO 2013-045251 | 4/2013 |
| WO | WO 2013-070576 | 5/2013 |
| WO | WO 2014-070468 | 5/2014 |

OTHER PUBLICATIONS

De Pellegrin "Simulation of three-dimensional abrasive particles", Wear, 2005, vol. 258, pp. 208-216.
Saint Gobin Staff, "Investigation of Shaped Abrasive Particles vol. 1: Review of U.S. Pat. No. 6,054,093", Apr. 25, 2000, 5 pages.
International Search Report for PCT International Application No. PCT/US2013/031972 dated Jun. 21, 2013, 3 pages.
Notice of Opposition to European Patent 2834040, dated Jan. 26, 2022, 27 pages.

* cited by examiner

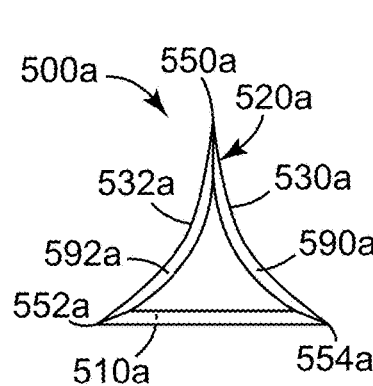 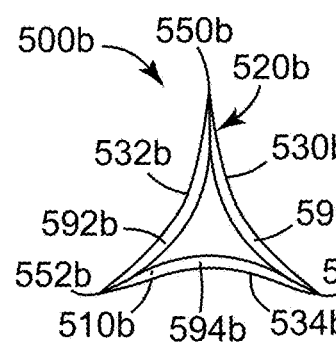 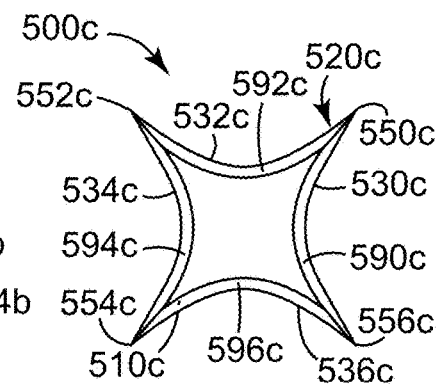
*FIG. 5A*     *FIG. 5B*     *FIG. 5C*
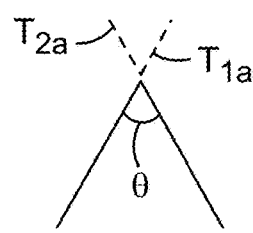 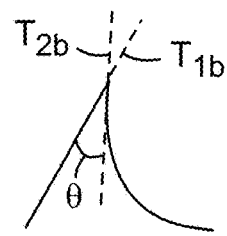
*FIG. 6A*     *FIG. 6B*
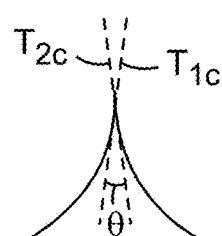 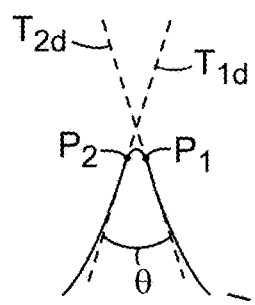
*FIG. 6C*     *FIG. 6D*

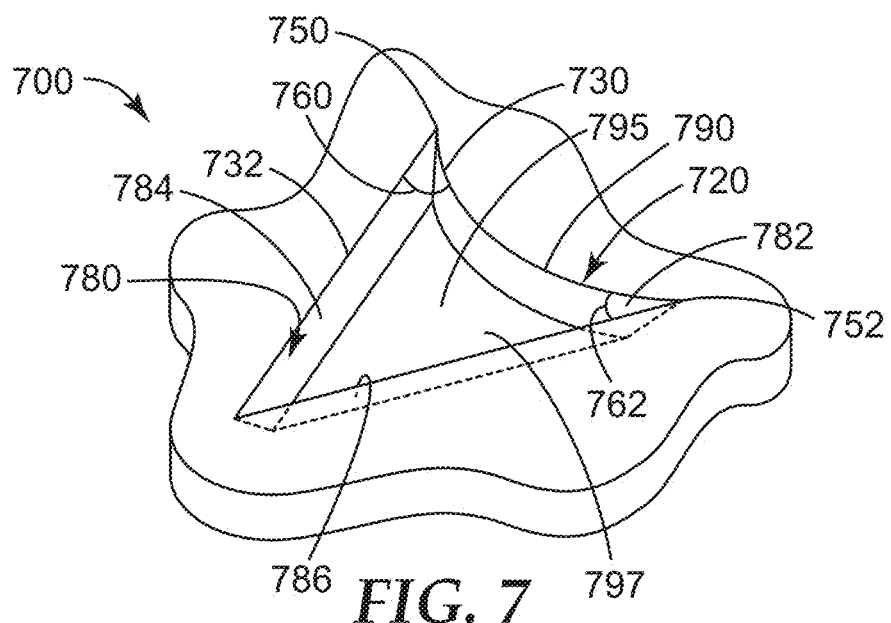
FIG. 7
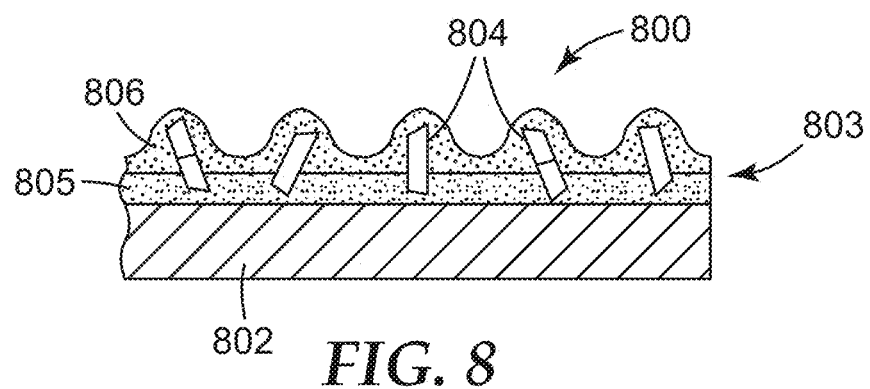
FIG. 8
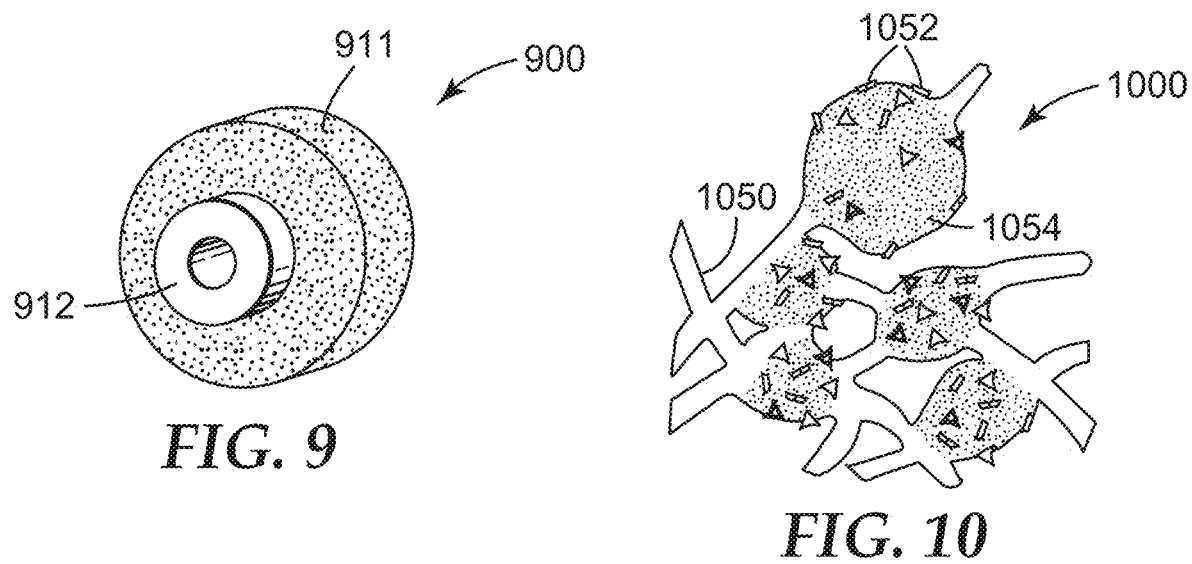
FIG. 9
FIG. 10

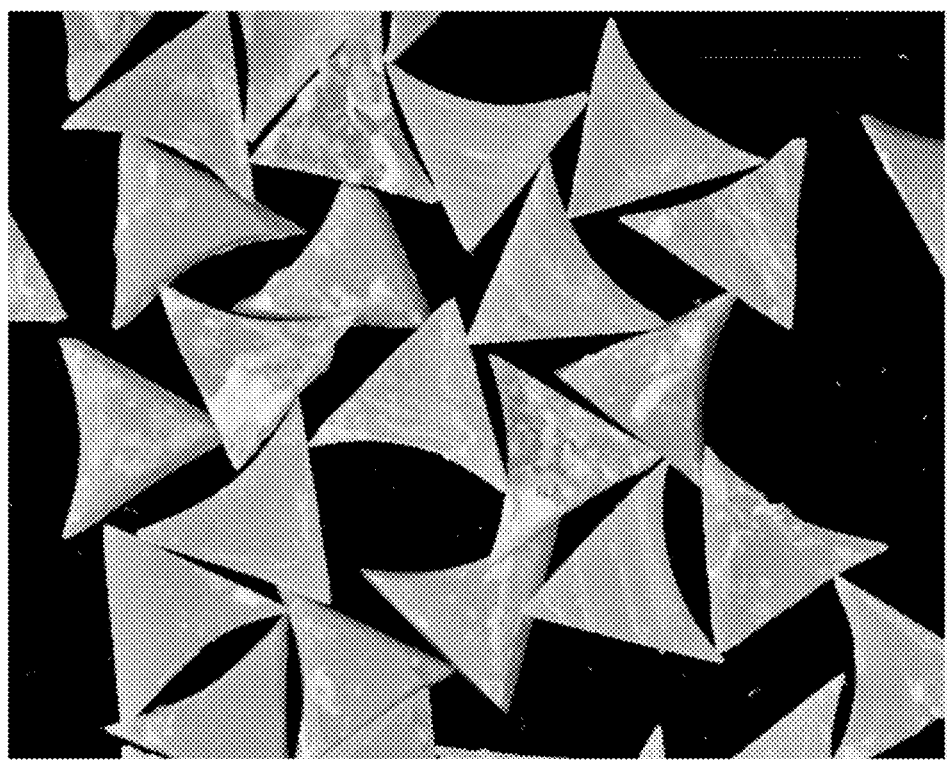
*FIG. 11*  1 mm
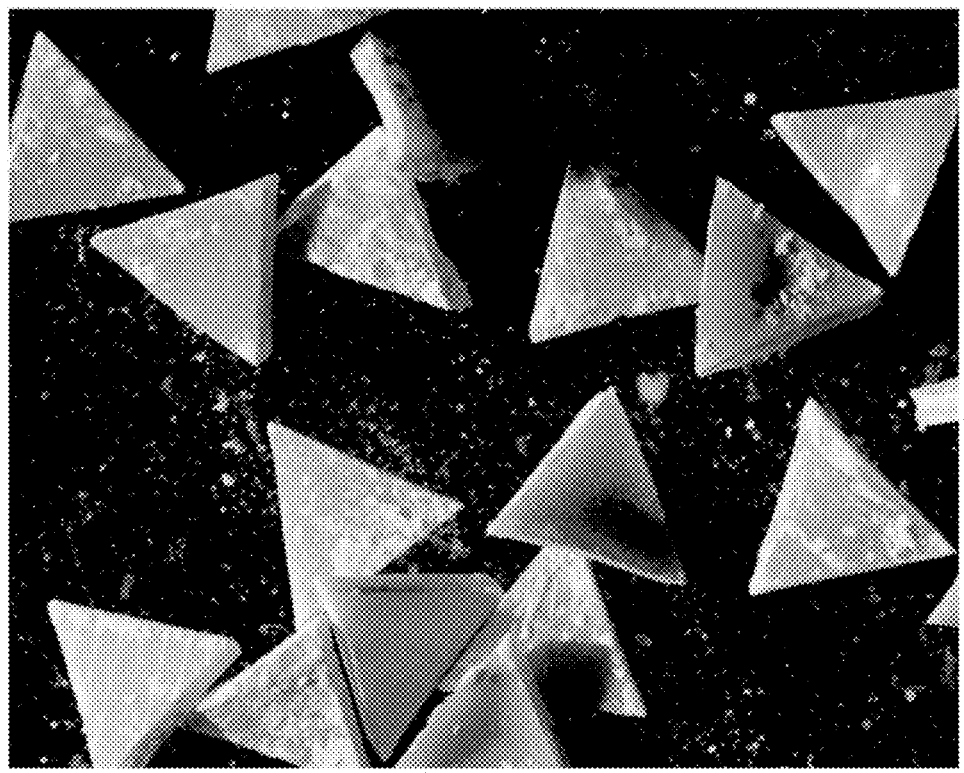
*FIG. 12*  1 mm
PRIOR ART

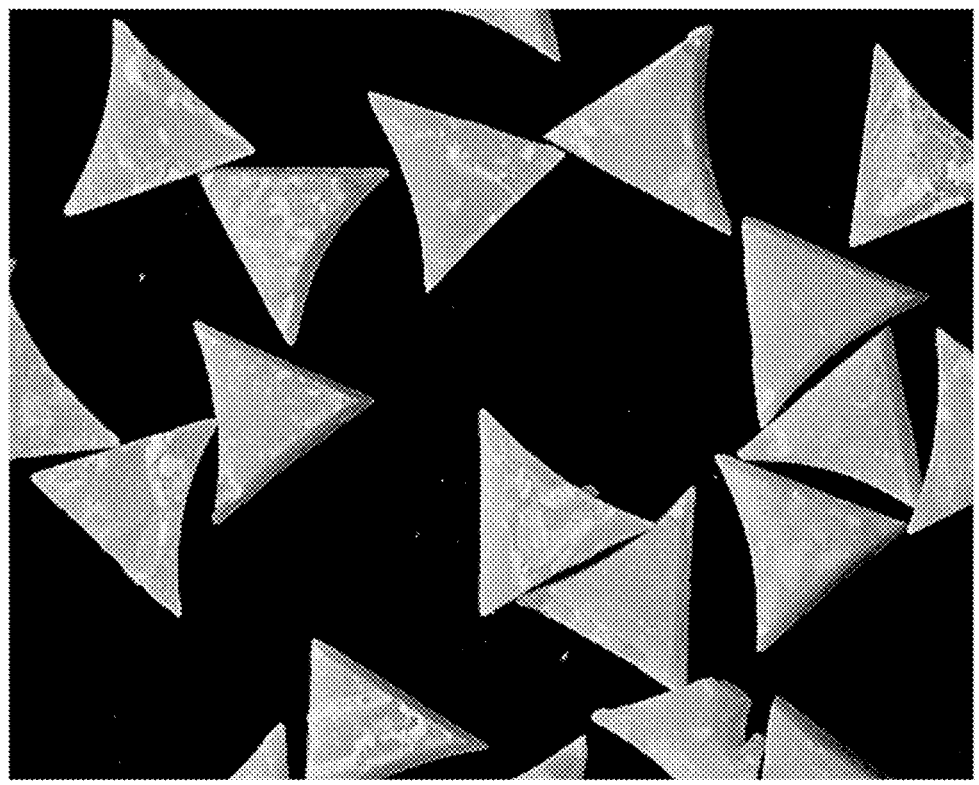
*FIG. 15*  1 mm
*FIG. 16*  1 mm

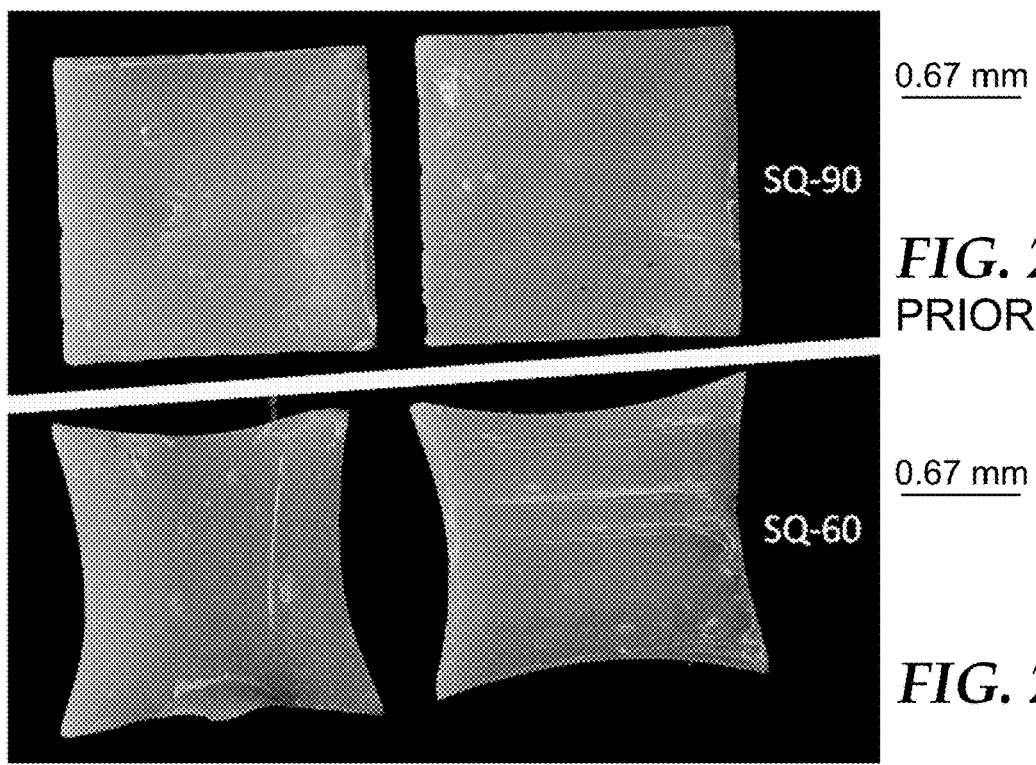
*FIG. 20A* PRIOR ART
*FIG. 20B*
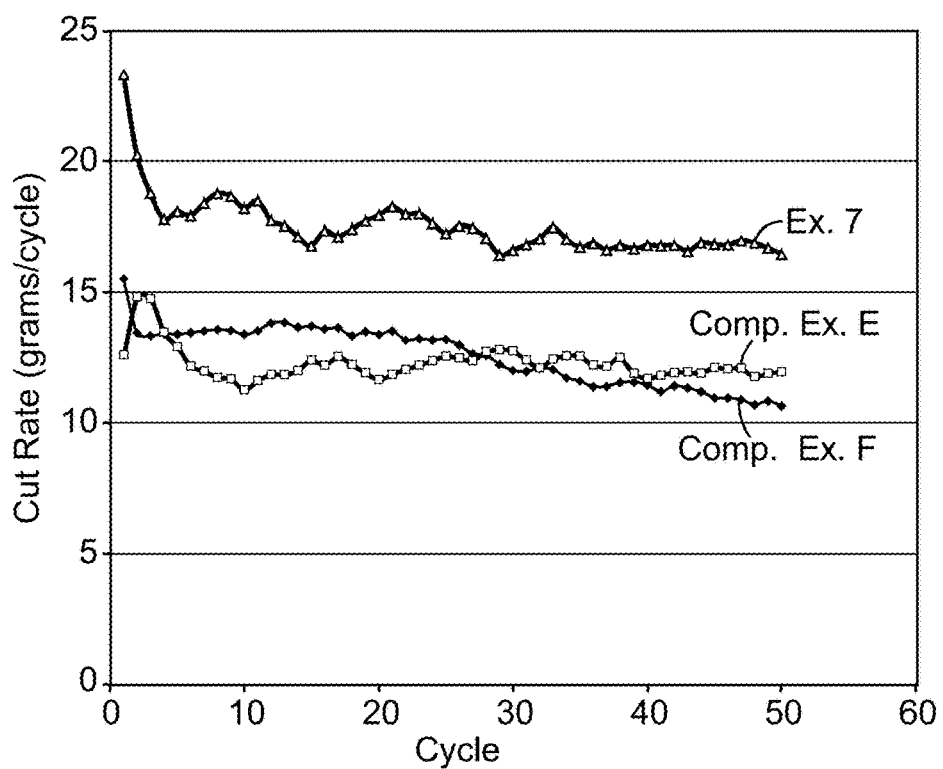
*FIG. 21*

ABRASIVE PARTICLES, METHOD OF MAKING ABRASIVE PARTICLES, AND ABRASIVE ARTICLES

FIELD

The present disclosure broadly relates to abrasive particles, abrasive articles, and methods of making and using the same.

BACKGROUND

In recent years, shaped abrasive particles produced by molding a sol-gel, drying, and sintering the dried sol-gel to obtain a shaped ceramic abrasive particle have gained popularity in the abrasives industry. Diamond turning techniques are commonly used to make suitable molds, especially those for producing fine grades of abrasive particles, but have been limited in terms of the shapes of mold cavities that can be produced.

SUMMARY

The present inventor has discovered that by lessening the angle formed at peripheral corners of shaped ceramic abrasive particles, improved abrasive properties can be achieved.

Shaped abrasive particles, in general, can have superior performance over randomly crushed abrasive particles. By controlling the shape of the abrasive particle it is possible to control the resulting performance of the abrasive article. The inventor has discovered that by making at least one edge of shaped abrasive particles inwardly extending, adjacent corners are typically sharpened, leading to unexpected improvement in abrading performance.

In one aspect, the present disclosure provides a shaped ceramic abrasive particle comprising:
 a first surface having a perimeter comprising at least first and second edges, wherein a first region of the perimeter comprises the second edge and extends inwardly and terminates at two corners defining first and second acute interior angles, and wherein the perimeter has at most four corners that define acute interior angles;
 a second surface opposite, and not contacting, the first surface; and
 a peripheral surface disposed between and connecting the first and second surfaces, wherein the peripheral surface comprises a first wall that contacts the perimeter at the first edge, wherein the peripheral surface comprises a second wall that contacts the perimeter at the second edge, and wherein the peripheral surface has a first predetermined shape.

In another aspect, the present disclosure provides a plurality of abrasive particles, wherein the plurality of abrasive particles comprises, on a numerical basis, at least 10, 20, 30, 40, 50, 60, 70, 80, 90, 95, or even at least 99 percent of the shaped ceramic abrasive particles according to the present disclosure.

Abrasive particles according to the present disclosure are useful, for example, in manufacture and use of abrasive articles.

In yet another aspect, the present disclosure provides abrasive articles comprising shaped ceramic abrasive particles according to the present disclosure retained in a binder.

The present inventors have also developed methods enabling the manufacturing of shaped ceramic abrasive particles (including fine grades) according to the present disclosure.

Accordingly, in yet another aspect, the present disclosure provides a method of making shaped ceramic abrasive particles, the method comprising steps:
 a) providing a mold defining a mold cavity, wherein the mold cavity has an outer opening defined by a perimeter, wherein the perimeter comprises at least the first and second edges, wherein a first region of the perimeter comprises the second edge and extends inwardly and terminates at two corners defining first and second acute interior angles, and wherein the perimeter has at most four corners that define acute interior angles, and wherein the mold cavity is laterally bounded by a peripheral mold surface comprising a first mold wall that intersects the perimeter at the first edge and a second mold wall that intersects the perimeter at the second edge;
 b) disposing a ceramic precursor material within the mold cavity;
 c) converting the ceramic precursor material disposed within the mold cavity into a shaped ceramic precursor particle; and
 d) converting the shaped ceramic precursor particle into the shaped ceramic abrasive particle.

In some embodiments, the method further comprises separating the shaped ceramic precursor particle from the mold prior to step d). In some embodiments, step d) comprises sintering the shaped ceramic precursor particle. In some embodiments, step d) comprises calcining the shaped ceramic precursor particle to provide a calcined shaped ceramic precursor particle, and sintering the calcined shaped ceramic precursor particle.

The following definitions apply throughout the specification and claims.

The term "angle" is defined hereinbelow, for example, in reference to FIGS. 6A-6D.

The term "calcining" refers to removal volatile matter (e.g., free water) from a ceramic precursor by heating at lower temperature conditions than typically used for sintering.

The term "ceramic abrasive particle" refers to an abrasive particle comprising ceramic material.

The term "corner" refers to the place, position, or angle formed by the meeting of two converging lines or edges. A corner may be sharp as, e.g., a point or edge. A corner may also be a generally rounded region connecting adjacent lines or faces.

The term "draft angle" refers to an angle of taper, incorporated into a wall of a mold cavity so that the opening of the mold cavity is wider than its base. Referring now to FIG. 1, which shows a cross-section of mold 100 and mold cavity 105, draft angle μ is the angle between mold base 150 and mold wall 130. The draft angle can be varied to change the relative sizes of the first and second surfaces and the sides of the peripheral surface. In various embodiments of the present disclosure, the draft angle μ can be 90 degrees or in a range of from about 95 degrees to about 130 degrees, from about 95 degrees to about 125 degrees, from about 95 degrees to about 120 degrees, from about 95 degrees to about 115 degrees, from about 95 degrees to about 110 degrees, from about 95 degrees to about 105 degrees, or from about 95 degrees to about 100 degrees. As used herein, the term draft angle also refers to the angle of taper of walls of a molded body corresponding to the draft angle of the mold used to produce it. For example, a draft angle of the exemplary shaped ceramic abrasive particle 300 in FIG. 3 would be the angle between second surface 370 and wall 384.

The term "face" refers to a substantially planar surface, which may comprise minor imperfections, for example, as arising during manufacture.

The term "interior angle" refers to an angle, within the perimeter, defined by two adjacent edges of the perimeter.

The term "length" refers to the maximum extent of an object along its greatest dimension.

The term "major surface" refers to a surface that is larger than at least half of the surfaces in the object being referenced.

The term "perimeter" refers to a closed boundary of a surface, which may be a planar surface, or a non-planar surface.

The term "predetermined shape" means that the shape is replicated from a mold cavity used during making of the ceramic abrasive particle. The term "predetermined shape" excludes random shapes obtained by a mechanical crushing operation.

The term "sintering" refers a process in which heating of a ceramic precursor material causes it to undergo substantial transformation to a corresponding ceramic material.

The term "thickness" refers to the maximum extent of something along a dimension orthogonal to both the length and the width.

The term "width" refers to the maximum extent of something along a dimension orthogonal to the length.

The features and advantages of the present disclosure will be further understood upon consideration of the detailed description as well as the appended claims.

BRIEF DESCRIPTION OF THE DRAWINGS

FIGS. 5A-5C are schematic top views of other exemplary shaped ceramic abrasive particles according to the present disclosure.

FIGS. 6A-6D are schematic top views of various corners showing how to calculate their angle.

FIG. 7 is a schematic cutaway perspective view of an exemplary mold useful in making shaped ceramic abrasive particles according to the present disclosure.

FIG. 8 is a cross-sectional edge view of an exemplary coated abrasive article according to the present disclosure.

FIG. 9 is a perspective view of a bonded abrasive article according to the present disclosure.

FIG. 10 is an enlarged side view of a nonwoven abrasive article according to the present disclosure.

FIG. 11 is a photomicrograph of shaped ceramic abrasive particles SAP1.

FIG. 12 is a photomicrograph of shaped alumina abrasive particles SAPA, prepared according to the disclosure of paragraph [0128] of U.S. Pat. Appln. Publ. No. 2010/0146867 (Boden et al.) using a draft angle of 98 degrees.

FIG. 15 is a photomicrograph of shaped ceramic abrasive particles SAP2.

FIG. 16 is a photomicrograph of shaped ceramic abrasive particles SAP3.

FIG. 20A is a photomicrograph of shaped alumina abrasive particles SAPB, prepared according to the disclosure of U.S. Pat. No. 8,142,531 (Adefris et al.).

FIG. 20B is a photomicrograph of shaped ceramic abrasive particles SAP4.

FIG. 21 is a plot comparing the performance of discs of Example 7, Comparative Example E and Comparative Example F.

While the above-identified drawing figures set forth several embodiments of the present disclosure, other embodiments are also contemplated; for example, as noted in the discussion. In all cases, the disclosure is presented by way of representation and not limitation. It should be understood that numerous other modifications and embodiments can be devised by those skilled in the art, which fall within the scope and spirit of the principles of the disclosure. The figures may not be drawn to scale. Like reference numbers may have been used throughout the figures to denote like parts.

DETAILED DESCRIPTION

Figure 1:
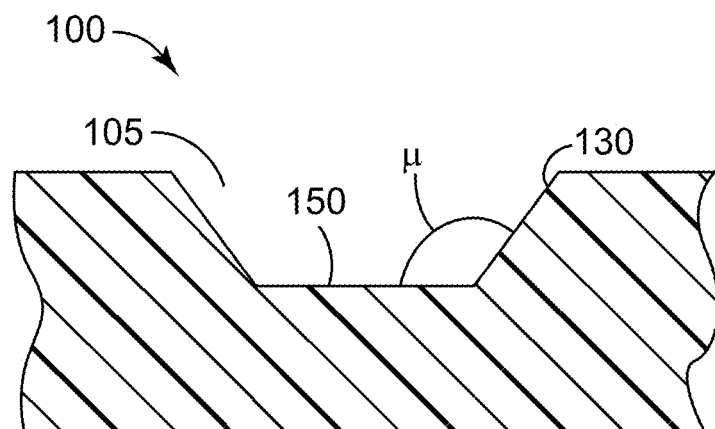
FIG. 1 is a schematic cross-sectional edge view of an exemplary mold showing how to determine a draft angle.
Figure 2:
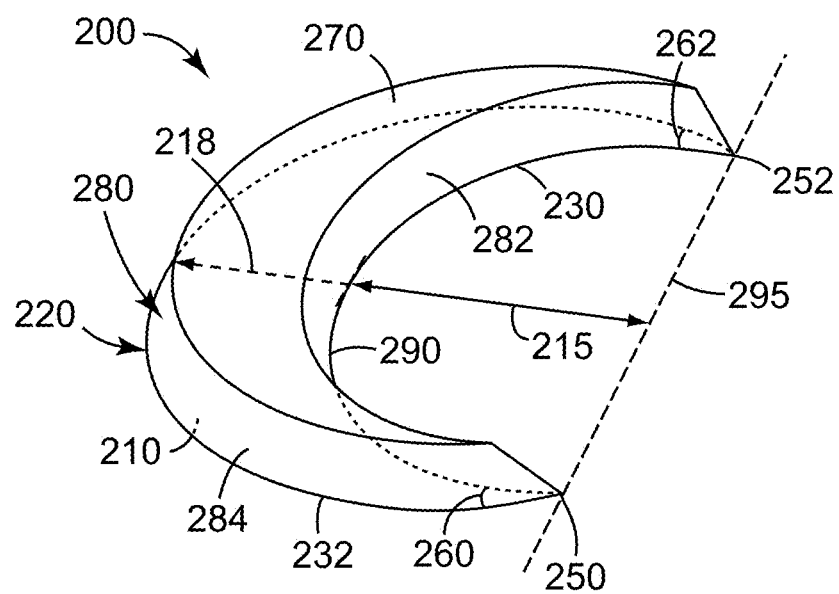
FIG. 2 is a schematic perspective view of an exemplary shaped ceramic abrasive particle according to the present disclosure.

Referring now to FIG. 2, exemplary shaped ceramic abrasive particle 200 comprises first surface 210 having perimeter 220. Second surface 270 is opposite, and does not contact first surface 210. Peripheral surface 280 has a predetermined shape, and is disposed between and connects first and second major surfaces 210, 270. Perimeter 220 comprises first and second edges 230, 232. Peripheral surface 280 comprises first and second walls 282, 284. First and second edges 230, 232 respectively represent the intersection of first and second walls 282, 284 with perimeter 220. First region 290 of perimeter 220 comprises first edge 230 and extends inwardly and terminates at first and second corners 250, 252 defining respective acute interior angles 260, 262.

In some embodiments, an inwardly extending region of a shaped ceramic abrasive particle according to the present disclosure may have a maximum depth that is at least 5, 10, 15, 20, 25, 30, 35, 40, 45, 50, 55, or even 60 percent of the maximum dimension of the shaped ceramic abrasive particle parallel to the maximum depth. For example, reference is made to FIG. 2, which shows maximum dimension 218 parallel to maximum depth 215. Similarly, in FIG. 3, maximum dimension 318 is parallel to maximum depth 315.

In the embodiment shown in FIG. 2, first surface 210 has a first predetermined shape that corresponds to the base of a mold cavity used to form it. However, if mold having two opposed openings is used (e.g., as in the case of a perforated plate), neither of the first or second major surfaces may have a predetermined shape, while the peripheral surface will.

Figure 3:
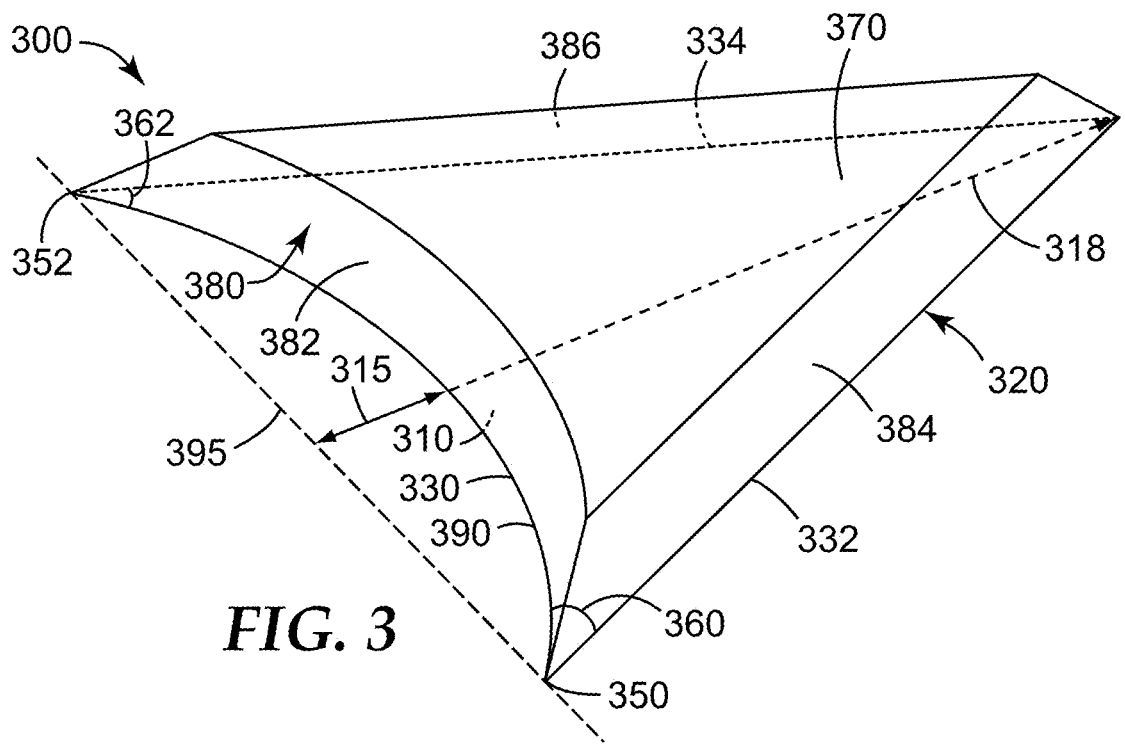
FIG. 3 is a schematic perspective view of an exemplary shaped ceramic abrasive particle according to the present disclosure.

In some embodiments, shaped ceramic abrasive particles according to the present disclosure have a peripheral surface that includes at least three walls. Referring now to FIG. 3, exemplary shaped ceramic abrasive particle 300 comprises first surface 310 having perimeter 320. Perimeter 320 comprises first, second, and third edges 330, 332, 334. First edge 330 is a concave monotonic curve, while second and third edges 332, 334 are substantially straight edges. Second surface 370 is opposite, and does not contact, first major surface 310. Peripheral surface 380 has a predetermined shape, and is disposed between and connects first and second surfaces 310, 370. Peripheral surface 380 comprises first, second, and third walls 382, 384, 386. First, second, and third edges 330, 332, 334 respectively represent the intersection of first, second, and third walls 382, 384, 386 with perimeter 320. First region 390 of perimeter 320 comprises inwardly extending first edge 330, and terminates at first and second corners 350, 352 defining respective first and second acute interior angles 360, 362.

As shown in FIGS. 2 and 3, the first region of the perimeter may comprise a single curved inwardly extending edge, however it is also contemplated that the first region of the perimeter may comprise multiple edges (e.g., 2, 3, 4, 5, 6, 7, 8, 9, 10 edges, or more).

Figure 4:
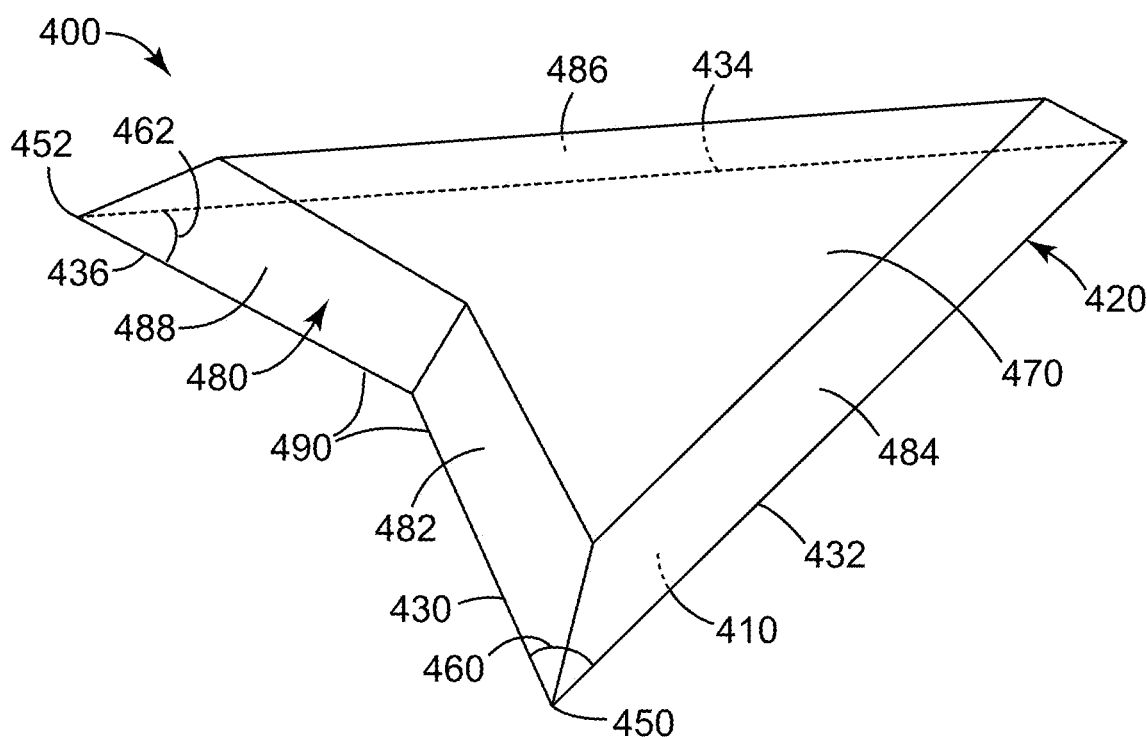
FIG. 4 is a schematic perspective view of another exemplary shaped ceramic abrasive particle according to the present disclosure.

Referring now to FIG. 4, exemplary shaped ceramic abrasive particle 400 comprises first surface 410 having perimeter 420. Perimeter 420 comprises first, second, third, and fourth substantially straight edges 430, 432, 434, 436. Second surface 470 is opposite, and does not contact, first surface 410. Peripheral surface 480 comprises first, second, third, and fourth walls 482, 484, 486, 488. Peripheral surface 480 has a predetermined shape, and is disposed between and connects first and second major surfaces 410, 470. First, second, third, and fourth edges 430, 432, 434, 436 respectively represent the intersection of first, second, third, and fourth walls 482, 484, 486, and 488 with perimeter 420. First region 490 of perimeter 420 comprises first edge 430 and fourth edge 436, and extends inwardly. First region 490 terminates at first and second corners 450, 452 defining respective first and second acute interior angles 460, 462.

FIGS. 3 and 4 depict shaped ceramic abrasive particles that have perimeters that are arrowhead-shaped. Likewise, in some embodiments, the shaped ceramic abrasive particles themselves may be arrowhead shaped.

In some embodiments, more than one region and/or edge of the perimeter may be inwardly extending. For example, referring now to FIG. 5A, exemplary shaped ceramic abrasive particle 500a has perimeter 520a of first surface 510a with two inwardly extending regions 590a, 592a formed by edges 530a, 532a and each terminating at two of acute corners 550a, 552a, 554a. Referring now to FIG. 5B, exemplary shaped ceramic abrasive particle 500b has perimeter 520b of first surface 510b with three inwardly extending regions 590b, 592b, 594b formed by edges 530b, 532b, 534b and each terminating at two of acute corners 550b, 552b, 554b. Likewise, referring now to FIG. 5C, exemplary shaped ceramic abrasive particle 500c of first surface 510c has perimeter 520c with four inwardly extending regions 590c, 592c, 594c, 596c formed by edges 530c, 532c, 534c, 536c at each terminating at two corners 550c, 552c, 554c, 556c defining acute interior angles (not shown).

By definition, the perimeter of the first major surface, except for any inwardly extending regions, extends outwardly. For example, the perimeter may be outwardly extending except for one, two, three, or four inwardly extending regions. Inwardly extending region(s) of the perimeter may comprise, for example, single curved edge(s) (e.g., monotonic curved edge(s)), or multiple curved or substantially straight (e.g., linear) edges, or a combination of curved and substantially straight edges.

Typically, shaped ceramic abrasive particles according to the present disclosure have thicknesses that are substantially less than their length and/or width, although this is not a requirement. For example, the thickness of shaped ceramic abrasive particle may be less than or equal to one-third, one-fifth, or one-tenth of its length and/or width.

Generally, the first and second surfaces are substantially parallel, or even parallel; however, this is not a requirement. For example, random deviations due to drying may result in one or both of the first and second major surfaces being non planar. Likewise, the first and/or second major surface may have parallel grooves formed therein, for example, as described in U.S. Pat. Appln. Publ. No. 2010/0146867 A1 (Boden et al.).

Shaped ceramic abrasive particles according to the present disclosure comprise ceramic material. In some embodiments, they may consist essentially of ceramic material or even consist of ceramic material, although they may contain non-ceramic phases (e.g., as in a glass-ceramic). Examples of suitable ceramic materials include alpha alumina, fused alumina-zirconia, and fused oxynitrides. Further details concerning sol-gel derived ceramic materials suitable for use in shaped ceramic abrasive particles according to the present disclosure can be found in, for example, U.S. Pat. No. 4,314,827 (Leitheiser et al.); U.S. Pat. No. 4,518,397 (Leitheiser et al.); U.S. Pat. No. 4,623,364 (Cottringer et al.); U.S. Pat. No. 4,744,802 (Schwabel); U.S. Pat. No. 4,770,671 (Monroe et al.); U.S. Pat. No. 4,881,951 (Wood et al.); U.S. Pat. No. 4,960,441 (Pellow et al.); U.S. Pat. No. 5,139,978 (Wood); U.S. Pat. No. 5,201,916 (Berg et al.); U.S. Pat. No. 5,366,523 (Rowenhorst et al.); U.S. Pat. No. 5,429,647 (Larmie); U.S. Pat. No. 5,547,479 (Conwell et al.); U.S. Pat. No. 5,498,269 (Larmie); U.S. Pat. No. 5,551,963 (Larmie); U.S. Pat. No. 5,725,162 (Garg et al.), and U.S. Pat. No. 6,054,093 (Tone et al.).

In order to facilitate removal from a mold used to make them, and typically to increase performance in abrading applications, shaped ceramic abrasive particles according to the present disclosure may be tapered corresponding a draft angle of the mold, for example, as described in U.S. Pat. Appln. Publ. No. 2010/0151196 A1 (Adefris et al.). In other embodiments, the peripheral surface may not taper (i.e., it may be vertical), and/or the first and second surfaces may have the same size and shape. In some embodiments, interior angles formed between the inwardly extending region and either or both adjacent edges of the perimeter are smaller than would be the case if the inwardly extending region was replaced, for example, by a single straight line segment or a convex edge. For example, in the case of an equilateral triangle, all corners have an interior angle of 60 degrees, while for corresponding shapes having a concave edge replacing one of the triangle's edges according to one embodiment of the present disclosure, the interior angles of the two corners adjacent to the inwardly extending region may be substantially reduced. For example, in the case of generally triangular shaped ceramic abrasive particles the interior angles may be in a range of from 5, 10, 15, 20, 25, or 30 degrees up to 35, 40, 45, 50, or 55 degrees, or from 40 to 55 degrees. In some embodiments, the interior angles may be in a range of from 35 to 55 degrees, from 40 to 55 degrees, or even from 45 to 55 degrees, although other values are also possible. Similarly, if two (or three) of the triangle's edges are replaced with inwardly extending curved edges, the interior angles of their adjacent corners may fall in the same range or be even lower. The same trend occurs in the case of perimeters having four or more edges, although the interior angle values may tend to be larger.

In order to measure the interior angle ($\theta$) of a corner of the perimeter, one takes the angle formed between the tangents ($T_1$, $T_2$) of respective edges forming the corner at their closest point to the corner that has not passed an inflection point with respect to the inwardly extending region. In the case of intersecting straight edges (e.g., as shown in FIG. 6A), tangents $T_{1a}$ and $T_{2a}$ have the same slope as the edges themselves and the interior angle can be easily determined. In the case where one or both or the edges are monotonic inwardly extending curves (e.g., as shown in FIGS. 6B and 6C), the tangents ($T_{1b}$ and $T_{2b}$ or $T_{1c}$ and $T_{2c}$), respectively) can likewise be readily determined by approaching the corner along the curved edge(s). However, if the corner is round or otherwise deformed (e.g., as shown in FIG. 6D), the measurement of the interior angle of the corner could become more problematic. Accordingly, in such cases, the tangents $T_{1d}$ and $T_{2d}$) should be determined by measuring the tangent of each adjacent edge as they approach the inflection points (if present) proximate to the corner, shown as $P_1$ and $P_2$ in FIG. 6D.

Shaped ceramic abrasive particles according to the present disclosure are typically used as a plurality of particles that may include the shaped ceramic abrasive particles of the present disclosure, other shaped abrasive particles, and/or crushed abrasive particles. For example, a plurality of abrasive particles according to the present disclosure may comprise, on a numerical basis, at least 10, 20, 30, 40, 50, 60, 70, 80, 90, 95, or even 99 percent, or more percent of shaped ceramic abrasive particles described herein. The shaped ceramic abrasive particles may have the same nominal size and shape, although in some embodiments, it may be useful to use a combination of sizes and/or shapes.

Typically, shaped ceramic abrasive particles according to the present disclosure have a relatively small maximum particle dimension; for example, less than about 1 centimeter (cm), 5 millimeters (mm), 2 mm, 1 mm, 200 micrometers, 100 micrometers, 50 micrometers, 20 micrometers, 10 micrometers, or even less than 5 micrometers, although other sizes may be used.

Any of the abrasive particles referred to in the present disclosure may be sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). Such industry accepted grading standards include, for example: ANSI 4, ANSI 6, ANSI 8, ANSI 16, ANSI 24, ANSI 30, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600; FEPA P8, FEPA P12, FEPA P16, FEPA P24, FEPA P30, FEPA P36, FEPA P40, FEPA P50, FEPA P60, FEPA P80, FEPA P100, FEPA P120, FEPA P150, FEPA P180, FEPA P220, FEPA P320, FEPA P400, FEPA P500, FEPA P600, FEPA P800, FEPA P1000, and FEPA P1200; and JIS 8, JIS 12, JIS 16, JIS 24, JIS 36, JIS 46, JIS 54, JIS 60, JIS 80, JIS 100, JIS 150, JIS 180, JIS 220, JIS 240, JIS 280, JIS 320, JIS 360, JIS 400, JIS 400, JIS 600, JIS 800, JIS 1000, JIS 1500, JIS 2500, JIS 4000, JIS 6000, JIS 8000, and JIS 10,000. More typically, the shaped ceramic abrasive particles are independently sized to ANSI 60 and 80 or FEPA P60 and P80 grading standards.

The term "abrasives industry recognized specified nominal grade" also includes abrasives industry recognized specified nominal screened grades. For example, specified nominal screened grades may use U.S.A. Standard Test Sieves conforming to ASTM E-11-09 "Standard Specification for Wire Cloth and Sieves for Testing Purposes." ASTM E-11-09 sets forth requirements for the design and construction of testing sieves using a medium of woven wire cloth mounted in a frame for the classification of materials according to a designated particle size. A typical designation may be represented as −18+20, meaning that the shaped ceramic abrasive particles pass through a test sieve meeting ASTM E11-09 "Standard Specification for Woven Wire Test Sieve Cloth and Test Sieves" specifications for the number 18 sieve and are retained on a test sieve meeting ASTM E11-09 specifications for the number 20 sieve. In one embodiment, the shaped ceramic abrasive particles have a particle size such that at least 90 percent of the particles pass through an 18 mesh test sieve and can be retained on a 20, 25, 30, 35, 40, 45, or 50 mesh test sieve. In various embodiments, the shaped ceramic abrasive particles can have a nominal screened grade comprising: −18+20, −20/+25, −25+30, −30+35, −35+40, 5−40+45, −45+50, −50+60, −60+70, −70/+80, −80+100, −100+120, −120+140, −140+170, −170+200, −200+230, −230+270, −270+325, −325+400, −400+450, −450+500, or −500+635.

In some embodiments, shaped ceramic abrasive particles can be made according to a multistep process. The process can be carried out using a ceramic precursor dispersion (e.g., a dispersion (e.g., a sol-gel) comprising a ceramic precursor material).

Briefly, the method comprises the steps of making either a seeded or non-seeded ceramic precursor dispersion that can be converted into a corresponding ceramic (e.g., a boehmite sol-gel that can be converted to alpha alumina); filling one or more mold cavities having the desired outer shape of the shaped abrasive particle with a ceramic precursor dispersion, drying the ceramic precursor dispersion to form shaped ceramic precursor particles; removing the shaped ceramic precursor particles from the mold cavities; calcining the shaped ceramic precursor particles to form calcined, shaped ceramic precursor particles, and then sintering the calcined, shaped ceramic precursor particles to form shaped ceramic abrasive particles.

In some embodiments, the calcining step is omitted and the shaped ceramic precursor particles are sintered directly after removal from the mold. In some embodiments, the mold may be made of a sacrificial material (e.g., a polyolefin material) that is burned off during calcining or sintering, thereby eliminating to separate the ceramic precursor particles from it during processing.

The process will now be described in greater detail in the context of alpha-alumina-containing shaped ceramic abrasive particles.

The first process step involves providing either a seeded or non-seeded dispersion of a ceramic precursor material (i.e., a ceramic precursor dispersion) that can be converted into a ceramic material. The ceramic precursor dispersion often comprises a volatile liquid component. In one embodiment, the volatile liquid component is water. The ceramic precursor dispersion should comprise a sufficient amount of liquid for the viscosity of the dispersion to be sufficiently low to enable filling mold cavities and replicating the mold surfaces, but not so much liquid as to cause subsequent removal of the liquid from the mold cavity to be prohibitively expensive. In one embodiment, the ceramic precursor dispersion comprises from 2 to 90 percent by weight of the particles that can be converted into ceramic, such as particles of aluminum oxide monohydrate (boehmite) or another alumina precursor, and at least 10 to 98 percent by weight, or from 50 to 70 percent by weight, or 50 to 60 percent by weight, of the volatile component such as water. Conversely, the ceramic precursor dispersion in some embodiments contains from 30 to 50 percent, or 40 to 50 percent by weight solids.

Examples of useful ceramic precursor dispersions include zirconium oxide sols, vanadium oxide sols, cerium oxide sols, aluminum oxide sols, and combinations thereof. Useful aluminum oxide dispersions include, for example, boehmite dispersions and other aluminum oxide hydrates dispersions. Boehmite can be prepared by known techniques or can be obtained commercially. Examples of commercially available boehmite include products having the trade designations "DISPERAL", and "DISPAL", both available from Sasol North America, Inc. or "HIQ-40" available from BASF Corporation. These aluminum oxide monohydrates are relatively pure; that is, they include relatively little, if any, hydrate phases other than monohydrates, and have a high surface area.

The physical properties of the resulting shaped ceramic abrasive particles will generally depend upon the type of material used in the ceramic precursor dispersion. As used herein, a "gel" is a three dimensional network of solids dispersed in a liquid.

The ceramic precursor dispersion may contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the ceramic precursor dispersion can be varied based on skill in the art.

Typically, the introduction of a modifying additive or precursor of a modifying additive will cause the ceramic precursor dispersion to gel. The ceramic precursor dispersion can also be induced to gel by application of heat over a period of time to reduce the liquid content in the dispersion through evaporation. The ceramic precursor dispersion can also contain a nucleating agent. Nucleating agents suitable for this disclosure can include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina. Nucleating alpha alumina precursor dispersions is disclosed in U.S. Pat. No. 4,744,802 (Schwabel).

A peptizing agent can be added to the ceramic precursor dispersion to produce a more stable hydrosol or colloidal ceramic precursor dispersion. Suitable peptizing agents are monoprotic acids or acid compounds such as acetic acid, hydrochloric acid, formic acid, and nitric acid. Multiprotic acids can also be used but they can rapidly gel the ceramic precursor dispersion, making it difficult to handle or to introduce additional components thereto. Some commercial sources of boehmite contain an acid titer (such as absorbed formic or nitric acid) that will assist in forming a stable ceramic precursor dispersion.

The ceramic precursor dispersion can be formed by any suitable means; for example, in the case of a sol-gel alumina precursor by simply mixing aluminum oxide monohydrate with water containing a peptizing agent or by forming an aluminum oxide monohydrate slurry to which the peptizing agent is added.

Defoamers or other suitable chemicals can be added to reduce the tendency to form bubbles or entrain air while mixing. Additional chemicals such as wetting agents, alcohols, or coupling agents can be added if desired.

The second process step involves providing a mold having at least one mold cavity, and preferably a plurality of cavities formed in at least one major surface of the mold.

Referring now to FIG. 7, exemplary mold 700 defines mold cavity 795. Mold cavity 795 is laterally bounded by peripheral mold surface 780 comprising first, second, and third mold walls 782, 784, 786. Mold cavity 795 has outer opening 797 defined by a perimeter 720. First mold wall 782 intersects perimeter 720 at first edge 730. Second mold wall 784 intersects perimeter 720 at second edge 732. First region 790 of perimeter 720 extends inwardly and comprises first edge 730, which terminates at first and second corners 750, 752, which define respective first and second acute interior angles 760, 762.

In some embodiments, the mold is formed as a production tool, which can be, for example, a belt, a sheet, a continuous web, a coating roll such as a rotogravure roll, a sleeve mounted on a coating roll, or a die. In one embodiment, the production tool comprises polymeric material. Examples of suitable polymeric materials include thermoplastics such as polyesters, polycarbonates, poly(ether sulfone), poly(methyl methacrylate), polyurethanes, polyvinylchloride, polyolefin, polystyrene, polypropylene, polyethylene or combinations thereof, or thermosetting materials. In one embodiment, the entire tooling is made from a polymeric or thermoplastic material. In another embodiment, the surfaces of the tooling in contact with the ceramic precursor dispersion while drying, such as the surfaces of the plurality of cavities, comprises polymeric or thermoplastic materials and other portions of the tooling can be made from other materials. A suitable polymeric coating may be applied to a metal tooling to change its surface tension properties by way of example.

A polymeric or thermoplastic production tool can be replicated off a metal master tool. The master tool will have the inverse pattern desired for the production tool. The master tool can be made in the same manner as the production tool. In one embodiment, the master tool is made out of metal, e.g., nickel and is diamond turned. In one embodiment, the master tool is at least partially formed using stereolithography. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that may distort the thermoplastic production tool limiting its life. More information concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672, 097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

Access to cavities can be from an opening in the top surface or bottom surface of the mold. In some instances, the cavities can extend for the entire thickness of the mold. Alternatively, the cavities can extend only for a portion of the thickness of the mold. In one embodiment, the top surface is substantially parallel to bottom surface of the mold with the cavities having a substantially uniform depth. At least one edge of the mold, that is, the edge in which the cavities are formed, can remain exposed to the surrounding atmosphere during the step in which the volatile component is removed.

The cavities have a specified three-dimensional shape to make the shaped ceramic abrasive particles. The depth dimension is equal to the perpendicular distance from the top surface to the lowermost point on the bottom surface. The depth of a given cavity can be uniform or can vary along its length and/or width. The cavities of a given mold can be of the same shape or of different shapes.

The third process step involves filling the cavities in the mold with the ceramic precursor dispersion (e.g., by a conventional technique). In some embodiments, a knife roll coater or vacuum slot die coater can be used. A mold release can be used to aid in removing the particles from the mold if desired. Typical mold release agents include oils such as peanut oil or mineral oil, fish oil, silicones, polytetrafluoroethylene, zinc stearate, and graphite. In general, mold release agent such as peanut oil, in a liquid, such as water or alcohol, is applied to the surfaces of the production tooling in contact with the ceramic precursor dispersion such that between about 0.1 mg/in$^2$ (0.02 mg/cm$^2$) to about 3.0 mg/in$^2$ (0.5 mg/cm$^2$), or between about 0.1 mg/in$^2$ (0.02 mg/cm$^2$) to about 5.0 mg/in$^2$ (0.8 mg/cm$^2$) of the mold release agent is present per unit area of the mold when a mold release is desired. In some embodiments, the top surface of the mold is coated with the ceramic precursor dispersion. The ceramic precursor dispersion can be pumped onto the top surface.

Next, a scraper or leveler bar (i.e., a screed) can be used to force the ceramic precursor dispersion fully into the cavity of the mold. The remaining portion of the ceramic precursor dispersion that does not enter cavity can be removed from top surface of the mold and recycled. In some embodiments, a small portion of the ceramic precursor dispersion can remain on the top surface and in other embodiments the top surface is substantially free of the dispersion. The pressure applied by the scraper or leveler bar is typically less than 100 psi (0.7 MPa), less than 50 psi (0.3 MPa), or even less than 10 psi (69 kPa). In some embodiments, no exposed surface of the ceramic precursor dispersion extends substantially beyond the top surface.

In those embodiments, wherein it is desired to have the exposed surfaces of the cavities result in substantially planar faces of the shaped ceramic abrasive particles, it may be desirable to overfill the cavities (e.g., using a micronozzle array) and slowly dry the ceramic precursor dispersion.

The fourth process step involves removing the volatile component to dry the dispersion. Desirably, the volatile component is removed by fast evaporation rates. In some embodiments, removal of the volatile component by evaporation occurs at temperatures above the boiling point of the volatile component. An upper limit to the drying temperature often depends on the material the mold is made from. For polypropylene tooling the temperature should be less than the melting point of the plastic. In one embodiment, for a water dispersion of between about 40 to 50 percent solids and a polypropylene mold, the drying temperatures can be between about 90° C. to about 165° C., or between about 105° C. to about 150° C., or between about 105° C. to about 120° C. Higher temperatures can lead to improved production speeds but can also lead to degradation of the polypropylene tooling limiting its useful life as a mold.

The fifth process step involves removing resultant shaped ceramic precursor particles from the mold cavities. The shaped ceramic precursor particles can be removed from the cavities by using the following processes alone or in combination on the mold: gravity, vibration, ultrasonic vibration, vacuum, or pressurized air to remove the particles from the mold cavities.

The shaped ceramic precursor particles can be further dried outside of the mold. If the ceramic precursor dispersion is dried to the desired level in the mold, this additional drying step is not necessary. However, in some instances it may be economical to employ this additional drying step to minimize the time that the ceramic precursor dispersion resides in the mold. Typically, the shaped ceramic precursor particles will be dried from 10 to 480 minutes, or from 120 to 400 minutes, at a temperature from 50° C. to 160° C., or at 120° C. to 150° C.

The sixth process step involves calcining the shaped ceramic precursor particles. During calcining, essentially all the volatile material is removed, and the various components that were present in the ceramic precursor dispersion are transformed into metal oxides. The shaped ceramic precursor particles are generally heated to a temperature from 400° C. to 800° C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, shaped ceramic precursor particles. Then the shaped ceramic precursor particles are pre-fired again. This option is further described in U.S. Pat. No. 5,164,348 (Wood).

The seventh process step involves sintering the calcined, shaped ceramic precursor particles to form ceramic particles. Prior to sintering, the calcined, shaped ceramic precursor particles are not completely densified and thus lack the desired hardness to be used as shaped ceramic abrasive particles. Sintering takes place by heating the calcined, shaped ceramic precursor particles to a temperature of from 1000° C. to 1650° C. The length of time to which the calcined, shaped ceramic precursor particles must be exposed to the sintering temperature to achieve this level of conversion depends upon various factors but usually from five seconds to 48 hours is typical.

In another embodiment, the duration for the sintering step ranges from one minute to 90 minutes. After sintering, the shaped ceramic abrasive particles can have a Vickers hardness of 10 GPa (gigapascals), 16 GPa, 18 GPa, 20 GPa, or greater.

Other steps can be used to modify the described process such as, for example, rapidly heating the material from the calcining temperature to the sintering temperature, centrifuging the ceramic precursor dispersion to remove sludge and/or waste. Moreover, the process can be modified by combining two or more of the process steps if desired. Conventional process steps that can be used to modify the process of this disclosure are more fully described in U.S. Pat. No. 4,314,827 (Leitheiser).

Shaped ceramic abrasive particles composed of crystallites of alpha alumina, magnesium alumina spinel, and a rare earth hexagonal aluminate may be prepared using sol-gel alpha alumina precursor particles according to methods described in, for example, U.S. Pat. No. 5,213,591 (Celikkaya et al.) and U.S. Publ. Pat. Appl. Nos. 2009/0165394 A1 (Culler et al.) and 2009/0169816 A1 (Erickson et al.). Alpha alumina abrasive particles may contain zirconia as disclosed in U.S. Pat. No. 5,551,963 (Larmie). Alternatively, alpha alumina abrasive particles may have a microstructure or additives, for example, as disclosed in U.S. Pat. No. 6,277,161 (Castro). More information concerning methods to make shaped ceramic abrasive particles is disclosed in co-pending U.S. Publ. Patent Appln. No. 2009/0165394 A1 (Culler et al.).

Surface coatings on the shaped ceramic abrasive particles may be used to improve the adhesion between the shaped ceramic abrasive particles and a binder material in abrasive articles, or can be used to aid in electrostatic deposition of the shaped ceramic abrasive particles. In one embodiment, surface coatings as described in U.S. Pat. No. 5,352,254 (Celikkaya) in an amount of 0.1 to 2 percent surface coating to shaped abrasive particle weight may be used. Such surface coatings are described in U.S. Pat. No. 5,213,591 (Celikkaya et al.); U.S. Pat. No. 5,011,508 (Wald et al.); U.S. Pat. No. 1,910,444 (Nicholson); U.S. Pat. No. 3,041,156 (Rowse et al.); U.S. Pat. No. 5,009,675 (Kunz et al.); U.S. Pat. No. 5,085,671 (Martin et al.); U.S. Pat. No. 4,997,461 (Markhoff-Matheny et al.); and U.S. Pat. No. 5,042,991 (Kunz et al.). Additionally, the surface coating may prevent the shaped abrasive particle from capping. Capping is the term to describe the phenomenon where metal particles from the workpiece being abraded become welded to the tops of the shaped ceramic abrasive particles. Surface coatings to perform the above functions are known to those of skill in the art.

The shaped ceramic abrasive particles of the present disclosure can typically be made using tools (or molds that are inverse replicas thereof) cut using diamond tooling, which provides higher feature definition than other fabrication alternatives such as, for example, stamping or punching. Typically, the cavities in the tool surface have smooth faces that meet along sharp edges, although this is not a requirement. The resultant shaped ceramic abrasive particles have a respective nominal average shape that corresponds to the shape of cavities in the tool surface; however, variations (e.g., random variations) from the nominal average shape may occur during manufacture, and shaped ceramic abrasive particles exhibiting such variations are included within the definition of shaped ceramic abrasive particles as used herein.

Shaped ceramic abrasive particles are useful, for example, in the construction of abrasive articles, including for example, agglomerate abrasive grain, coated abrasive articles (for example, conventional make and size coated abrasive articles, slurry coated abrasive articles, and structured abrasive articles), abrasive brushes, nonwoven abrasive articles, and bonded abrasive articles such as grinding wheels, hones and whetstones. In general, abrasive articles comprise a plurality of abrasive particles retained in a binder.

Coated abrasive articles generally include a backing, abrasive particles, and at least one binder to secure the abrasive particles to the backing. The backing can be any suitable material, including cloth, polymeric film, fiber, nonwoven webs, paper, combinations thereof, and treated versions thereof. Suitable binders include inorganic or organic binders (including thermally curable resins and radiation curable resins). The abrasive particles can be present in one layer or in two layers of the coated abrasive article.

An example of a coated abrasive article is depicted in FIG. 8. Referring to FIG. 8, exemplary coated abrasive article 800 has a backing (substrate) 802 and abrasive layer 803. Abrasive layer 803 includes shaped ceramic abrasive particles 804 secured to a major surface of backing 802 by make layer 805 and size layer 806. In some instances, a supersize coat (not shown) is used.

Bonded abrasive articles typically include a shaped mass of abrasive particles held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive articles typically comprise about 3-50 percent by volume bond material, about 30-90 percent by volume abrasive particles (or abrasive particle blends), up to 50 percent by volume additives (including grinding aids), and up to 70 percent by volume pores, based on the total volume of the bonded abrasive article.

An exemplary grinding wheel is shown in FIG. 9. Referring to FIG. 9, exemplary grinding wheel 900 is depicted, which includes shaped ceramic abrasive particles 911 according to the present disclosure, molded in a wheel and mounted on hub 912.

Nonwoven abrasive articles typically include an open porous lofty polymer filament structure having shaped ceramic abrasive particles made according to the present disclosure distributed throughout the structure and adherently bonded therein by an organic binder. Examples of filaments include polyester fibers, polyamide fibers, and polyaramid fibers. An exemplary nonwoven abrasive article is shown in FIG. 10. Referring to FIG. 10, a schematic depiction, greatly enlarged, of a typical nonwoven abrasive article 1000 is shown, comprises lofty open fibrous mat 1050 as a substrate, onto which shaped ceramic abrasive particles made according to the present disclosure 1052 are adhered by binder 1054.

Useful abrasive brushes include those having a plurality of bristles unitary with a backing (see, e.g., U.S. Pat. No. 5,427,595 (Pihl et al.), U.S. Pat. No. 5,443,906 (Pihl et al.), U.S. Pat. No. 5,679,067 (Johnson et al.), and U.S. Pat. No. 5,903,951 (Ionta et al.)). Desirably, such brushes are made by injection molding a mixture of polymer and abrasive particles.

Suitable organic binders for making abrasive articles include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant $\alpha,\beta$-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, or graphite), coupling agents (e.g., silanes, titanates or zircoaluminates), plasticizers, suspending agents. The amounts of these optional additives are selected to provide the desired properties. The coupling agents can improve adhesion to the abrasive particles and/or filler. The binder chemistry may be thermally cured, radiation cured or combinations thereof.

Additional details on binder chemistry may be found in U.S. Pat. No. 4,588,419 (Caul et al.), U.S. Pat. No. 4,751,138 (Tumey et al.), and U.S. Pat. No. 5,436,063 (Follett et al.).

More specifically with regard to vitrified bonded abrasives, vitreous bonding materials, which exhibit an amorphous structure and are typically hard, are well known in the art. In some cases, the vitreous bonding material includes crystalline phases. Bonded, vitrified abrasive articles made according to the present disclosure may be in the shape of a wheel (including cut off wheels), honing stone, mounted points or other conventional bonded abrasive shape. In some embodiments, a vitrified bonded abrasive article made according to the present disclosure is in the form of a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof. Typically, vitreous bonding materials can be formed from composition comprising from 10 to 100 percent glass frit, although more typically the composition comprises 20 to 80 percent glass frit, or 30 to 70 percent glass frit. The remaining portion of the vitreous bonding material can be a non-frit material. Alternatively, the vitreous bond may be derived from a non-frit containing composition. Vitreous bonding materials are typically matured at a temperature(s) in a range of about 700° C. to about 1500° C., usually in a range of about 800° C. to about 1300° C., sometimes in a range of about 900° C. to about 1200° C., or even in a range of about 950° C. to about 1100° C. The actual temperature at which the bond is matured depends, for example, on the particular bond chemistry.

In some embodiments, vitrified bonding materials include those comprising silica, alumina (desirably, at least 10 percent by weight alumina), and boria (desirably, at least 10 percent by weight boria). In most cases the vitrified bonding material further comprises alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers for this disclosure include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and physical processes of abrading, which results in improved performance. Although not wanting to be bound by theory, it is believed that a grinding aid(s) will (a) decrease the friction between the abrasive particles and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, or (d) decreases the grinding forces.

Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present disclosure to use a combination of different grinding aids, and in some instances this may produce a synergistic effect.

Grinding aids can be particularly useful in coated abrasive and bonded abrasive articles. In coated abrasive articles, grinding aid is typically used in the supersize coat, which is applied over the surface of the abrasive particles. Sometimes, however, the grinding aid is added to the size coat. Typically, the amount of grinding aid incorporated into coated abrasive articles are about 50-300 $g/m^2$ (desirably, about 80-160 $g/m^2$). In vitrified bonded abrasive articles grinding aid is typically impregnated into the pores of the article.

The abrasive articles can contain 100 percent shaped ceramic abrasive particles made according to the present disclosure, or blends of such abrasive particles with other abrasive particles and/or diluent particles. However, at least about 2 percent by weight, desirably at least about 5 percent by weight, and more desirably about 30-100 percent by weight, of the abrasive particles in the abrasive articles should be shaped ceramic abrasive particles made according to the present disclosure. In some instances, the abrasive particles made according to the present disclosure may be blended with other abrasive particles and/or diluent particles at a ratio between 5 to 75 percent by weight, about 25 to 75 percent by weight about 40 to 60 percent by weight, or about 50 to 55 percent by weight (i.e., in equal amounts by weight). Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles. In some instances, blends of abrasive particles may result in an abrasive article that exhibits improved grinding performance in comparison with abrasive articles comprising 100 percent of either type of abrasive particle.

Examples of suitable diluent particles include marble, gypsum, flint, silica, iron oxide, aluminum silicate, glass (including glass bubbles and glass beads), alumina bubbles, alumina beads and diluent agglomerates.

The abrasive particles may be uniformly distributed in the abrasive article or concentrated in selected areas or portions of the abrasive article. For example, in a coated abrasive, there may be two layers of abrasive particles. The first layer comprises abrasive particles other than shaped ceramic abrasive particles made according to the present disclosure, and the second (outermost) layer comprises shaped ceramic abrasive particles made according to the present disclosure.

Likewise in a bonded abrasive, there may be two distinct sections of the grinding wheel. The outermost section may comprise abrasive particles made according to the present disclosure, whereas the innermost section does not. Alternatively, shaped ceramic abrasive particles made according to the present disclosure may be uniformly distributed throughout the bonded abrasive article.

Further details regarding coated abrasive articles can be found, for example, in U.S. Pat. No. 4,734,104 (Broberg), U.S. Pat. No. 4,737,163 (Larkey), U.S. Pat. No. 5,203,884 (Buchanan et al.), U.S. Pat. No. 5,152,917 (Pieper et al.), U.S. Pat. No. 5,378,251 (Culler et al.), U.S. Pat. No. 5,417,726 (Stout et al.), U.S. Pat. No. 5,436,063 (Follett et al.), U.S. Pat. No. 5,496,386 (Broberg et al.), U.S. Pat. No. 5,609,706 (Benedict et al.), U.S. Pat. No. 5,520,711 (Helmin), U.S. Pat. No. 5,954,844 (Law et al.), U.S. Pat. No. 5,961,674 (Gagliardi et al.), and U.S. Pat. No. 5,975,988 (Christianson). Further details regarding bonded abrasive articles can be found, for example, in U.S. Pat. No. 4,543,107 (Rue), U.S. Pat. No. 4,741,743 (Narayanan et al.), U.S. Pat. No. 4,800,685 (Haynes et al.), U.S. Pat. No. 4,898,597 (Hay et al.), U.S. Pat. No. 4,997,461 (Markhoff-Matheny et al.), U.S. Pat. No. 5,037,453 (Narayanan et al.), U.S. Pat. No. 5,110,332 (Narayanan et al.), and U.S. Pat. No. 5,863,308 (Qi et al.). Further details regarding vitreous bonded abrasives can be found, for example, in U.S. Pat. No. 4,543,107 (Rue), U.S. Pat. No. 4,898,597 (Hay et al.), U.S. Pat. No. 4,997,461 (Markhoff-Matheny et al.), U.S. Pat. No. 5,094,672 (Giles Jr. et al.), U.S. Pat. No. 5,118,326 (Sheldon et al.), U.S. Pat. No. 5,131,926 (Sheldon et al.), U.S. Pat. No. 5,203,886 (Sheldon et al.), U.S. Pat. No. 5,282,875 (Wood et al.), U.S. Pat. No. 5,738,696 (Wu et al.), and U.S. Pat. No. 5,863,308 (Qi). Further details regarding nonwoven abrasive articles can be found, for example, in U.S. Pat. No. 2,958,593 (Hoover et al.).

The present disclosure provides a method of abrading a surface, the method comprising contacting at least one shaped ceramic abrasive particle made according to the present disclosure, with a surface of a workpiece; and moving at least of one the shaped ceramic abrasive particles or the contacted surface to abrade at least a portion of said surface with the abrasive particle. Methods for abrading with shaped ceramic abrasive particles made according to the present disclosure range from snagging (i.e., high pressure high stock removal) to polishing (e.g., polishing medical implants with coated abrasive belts), wherein the latter is typically done with finer grades (e.g., ANSI 220 and finer) of abrasive particles. The shaped ceramic abrasive particles may also be used in precision abrading applications, such as grinding cam shafts with vitrified bonded wheels. The size of the abrasive particles used for a particular abrading application will be apparent to those skilled in the art.

Abrading with shaped ceramic abrasive particles made according to the present disclosure may be done dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents.

Shaped ceramic abrasive particles made according to the present disclosure may be useful, for example, to abrade workpieces such as aluminum metal, carbon steels, mild steels, tool steels, stainless steel, hardened steel, titanium, glass, ceramics, wood, wood-like materials (e.g., plywood and particle board), paint, painted surfaces, organic coated surfaces and the like. The applied force during abrading typically ranges from about 1 to about 100 kilograms.

Select Embodiments of the Present Disclosure

In embodiment 1, the present disclosure provides a shaped ceramic abrasive particle comprising:
a first surface having a perimeter comprising at least first and second edges, wherein a first region of the perimeter comprises the second edge and extends inwardly and terminates at two corners defining first and second acute interior angles, and wherein the perimeter has at most four corners that define acute interior angles;
a second surface opposite, and not contacting, the first surface; and
a peripheral surface disposed between and connecting the first and second surfaces, wherein the peripheral surface comprises a first wall that contacts the perimeter at the first edge, wherein the peripheral surface comprises a second wall that contacts the perimeter at the second edge, and wherein the peripheral surface has a first predetermined shape.

In embodiment 2, the present disclosure provides a shaped ceramic abrasive particle according to embodiment 1, wherein the second surface has a second predetermined shape.

In embodiment 3, the present disclosure provides a shaped ceramic abrasive particle according to embodiment 1 or 2, wherein the second surface has the same shape as the first surface.

In embodiment 4, the present disclosure provides a shaped ceramic abrasive particle according to any one of embodiments 1 to 3, wherein the first acute interior angle is in a range of from 5 to 55 degrees, inclusive.

In embodiment 5, the present disclosure provides a shaped ceramic abrasive particle according to any one of embodiments 1 to 4, wherein the peripheral surface comprises a third wall that contacts the first surface at a third edge, wherein the first region of the perimeter further comprises the third edge, and wherein at least one of the second edge or the third edge is substantially straight.

In embodiment 6, the present disclosure provides a shaped ceramic abrasive particle according to embodiment 5, wherein the first and third edges are substantially straight.

In embodiment 7, the present disclosure provides a shaped ceramic abrasive particle according to any one of embodiments 4 to 6, wherein the peripheral surface consists of the first, second, and third walls.

In embodiment 8, the present disclosure provides a shaped ceramic abrasive particle according to any one of embodiments 4 to 7, wherein the peripheral surface further comprises a fourth wall that intersects the perimeter at a fourth edge.

In embodiment 9, the present disclosure provides a shaped ceramic abrasive particle according to embodiment 8, wherein the first, second, third, and fourth edges are inwardly extending.

In embodiment 10, the present disclosure provides a shaped ceramic abrasive particle according to any one of embodiments 1 to 9, wherein the second edge is a monotonic concave curve.

In embodiment 11, the present disclosure provides a shaped ceramic abrasive particle according to any one of embodiments 1 to 10, wherein the shaped ceramic abrasive particle has a thickness that is less than or equal to one-third of its width.

In embodiment 12, the present disclosure provides a shaped ceramic abrasive particle according to embodiment 11, and wherein the second acute interior angle is in a range of from 5 to 55 degrees, inclusive In embodiment 13, the present disclosure provides a shaped ceramic abrasive particle according to any one of embodiments 1 to 12, wherein the shaped ceramic abrasive particle has a length of less than or equal to one centimeter.

In embodiment 14, the present disclosure provides a shaped ceramic abrasive particle according to any one of embodiments 1 to 13, wherein the shaped ceramic abrasive particles consist essentially of ceramic material.

In embodiment 15, the present disclosure provides a shaped ceramic abrasive particle according to embodiment 14, wherein the ceramic material comprises alpha alumina.

In embodiment 16, the present disclosure provides a shaped ceramic abrasive particle according to any one of embodiments 1 to 15, wherein the first and second surfaces are substantially parallel.

In embodiment 17, the present disclosure provides a shaped ceramic abrasive particle according to any one of embodiments 1 to 16, wherein the peripheral surface slopes inwardly from the first surface toward the second surface.

In embodiment 18, the present disclosure provides a shaped ceramic abrasive particle according to any one of embodiments 1 to 17, wherein the peripheral surface slopes have a draft angle in a range of from 92 to 105 degrees, inclusive.

In embodiment 19, the present disclosure provides a shaped ceramic abrasive particle according to any one of embodiments 1 to 18, wherein the first surface is larger than the second surface.

In embodiment 20, the present disclosure provides a shaped ceramic abrasive particle according to any one of embodiments 1 to 19, wherein the first region of the perimeter is a monotonic curve.

In embodiment 21, the present disclosure provides a shaped ceramic abrasive particle according to any one of embodiments 1 to 20, wherein the perimeter the first edge is substantially straight and the second edge is curved.

In embodiment 22, the present disclosure provides a shaped ceramic abrasive particle according to any one of embodiments 1 to 21, wherein the perimeter first edge is substantially straight and the second edge is curved.

In embodiment 23, the present disclosure provides a shaped ceramic abrasive particle according to any one of embodiments 1 to 22, wherein the perimeter is arrowhead-shaped.

In embodiment 24, the present disclosure provides a plurality of abrasive particles, wherein the plurality of abrasive particles comprises, on a numerical basis, at least 10 percent of shaped ceramic abrasive particles according to any one of embodiments 1 to 23.

In embodiment 25, the present disclosure provides a plurality of abrasive particles, wherein the plurality of abrasive particles comprises, on a numerical basis, at least 30 percent of shaped ceramic abrasive particles according to any one of embodiments 1 to 23.

In embodiment 26, the present disclosure provides a plurality of abrasive particles, wherein the plurality of abrasive particles comprises, on a numerical basis, at least 50 percent of shaped ceramic abrasive particles according to any one of embodiments 1 to 23.

In embodiment 27, the present disclosure provides a plurality of abrasive particles, wherein the plurality of abrasive particles comprises, on a numerical basis, at least 70 percent of shaped ceramic abrasive particles according to any one of embodiments 1 to 23.

In embodiment 28, the present disclosure provides a plurality of abrasive particles according to any one of embodiments 24 to 27, further comprising crushed abrasive particles.

In embodiment 29, the present disclosure provides an abrasive article comprising a plurality of abrasive particles according to any one of embodiments 24 to 28 retained in a binder.

In embodiment 30, the present disclosure provides an abrasive article according to embodiment 29, wherein the abrasive article comprises a bonded abrasive article.

In embodiment 31, the present disclosure provides an abrasive article according to embodiment 30, wherein the bonded abrasive article comprises a bonded abrasive wheel.

In embodiment 32, the present disclosure provides an abrasive article according to embodiment 29, wherein the abrasive article comprises a coated abrasive article, the coated abrasive article comprising the plurality of abrasive particles secured to a backing having third and fourth opposed major surfaces.

In embodiment 33, the present disclosure provides an abrasive article according to embodiment 29, wherein the abrasive article comprises a nonwoven abrasive article, wherein the nonwoven abrasive article comprises the plurality of abrasive particles secured to a lofty open nonwoven fiber web.

In embodiment 34, the present disclosure provides a method of making shaped ceramic abrasive particles, the method comprising steps:

a) providing a mold defining a mold cavity, wherein the mold cavity has an outer opening defined by a perimeter, wherein the perimeter comprises at least the first and second edges, wherein a first region of the perimeter comprises the second edge and extends inwardly and terminates at two corners defining first and second acute interior angles, and wherein the perimeter has at most four corners that define acute interior angles, and wherein the mold cavity is laterally bounded by a peripheral mold surface comprising a first mold wall that intersects the perimeter at the first edge and a second mold wall that intersects the perimeter at the second edge;

b) disposing a ceramic precursor material within the mold cavity;

c) converting the ceramic precursor material disposed within the mold cavity into a shaped ceramic precursor particle; and d) converting the shaped ceramic precursor particle into the shaped ceramic abrasive particle.

In embodiment 35, the present disclosure provides a method according to embodiment 34, wherein the first corner has a first acute interior angle with a value in a range of from 5 to 55 degrees, inclusive In embodiment 36, the present disclosure provides a method according to embodiment 34 or 35, wherein the mold comprises an open mold.

In embodiment 37, the present disclosure provides a method according to embodiment 34 or 35, wherein the mold further comprises a bottom mold surface in contact with the first and second mold walls.

In embodiment 38, the present disclosure provides a method according to any one of embodiments 34 to 37, wherein the mold cavity has a depth, and wherein the first and second walls slope inwardly with increasing depth.

In embodiment 39, the present disclosure provides a method according to any one of embodiments 34 to 38, wherein the second edge comprises a curved edge.

In embodiment 40, the present disclosure provides a method according to any one of embodiments 34 to 39, wherein the first region of the perimeter is a monotonic curve.

In embodiment 41, the present disclosure provides a method according to any one of embodiments 34 to 40, wherein the perimeter comprises at least one substantially straight edge and at least one curved edge.

In embodiment 42, the present disclosure provides a method according to any one of embodiments 34 to 41, wherein the perimeter comprises at least two substantially straight edges and a curved edge.

In embodiment 43, the present disclosure provides a method according to any one of embodiments 34 to 42, wherein the perimeter consists of two substantially straight edges and a curved edge.

In embodiment 44, the present disclosure provides a method according to any one of embodiments 34 to 42, wherein the peripheral mold surface further comprises a third mold wall, and wherein the third mold wall intersects the perimeter at a third edge.

In embodiment 45, the present disclosure provides a method according to embodiment 44, wherein the third edge extends inwardly with respect to the perimeter.

In embodiment 46, the present disclosure provides a method according to any one of embodiments 34 to 45, wherein the perimeter is arrowhead-shaped.

In embodiment 47, the present disclosure provides a method according to any one of embodiments 34 to 46, wherein the perimeter comprises at least two substantially straight edges.

In embodiment 48, the present disclosure provides a method according to embodiment 47, wherein the peripheral surface further comprises a fourth mold wall, and wherein the fourth mold wall intersects the perimeter at a fourth edge.

In embodiment 49, the present disclosure provides a method according to any one of embodiments 34 to 48, wherein the method further comprises separating the shaped ceramic precursor particle from the mold prior to step d).

In embodiment 50, the present disclosure provides a method according to embodiment 49, wherein step d) comprises sintering the shaped ceramic precursor particle.

In embodiment 51, the present disclosure provides a method according to embodiment 49, wherein step d) comprises calcining the shaped ceramic precursor particle to provide a calcined shaped ceramic precursor particle, and sintering the calcined shaped ceramic precursor particle.

In embodiment 52, the present disclosure provides a method according to any one of embodiments 34 to 51, wherein the shaped ceramic abrasive particle comprises alpha alumina.

In embodiment 53, the present disclosure provides a method according to any one of embodiments 34 to 52, wherein the ceramic precursor material comprises a sol-gel.

In embodiment 54, the present disclosure provides a method according to any one of embodiments 34 to 53, wherein the ceramic precursor material comprises an alpha alumina precursor. In embodiment 55, the present disclosure provides a method according to any one of embodiments 34 to 54, wherein each mold cavity has a maximum lateral dimension of less than or equal to one centimeter.

In embodiment 56, the present disclosure provides a method according to any one of embodiments 34 to 55, wherein each of the shaped ceramic abrasive particles has a thickness that is less than or equal to one-third of its width.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Preparation of Shaped Ceramic Abrasive Particles

A sample of boehmite sol-gel was made using the following recipe: aluminum oxide monohydrate powder (1600 parts) available as DISPERAL from Sasol North America, Inc. was dispersed by high shear mixing in a solution containing water (2400 parts) and 70 aqueous nitric acid (72 parts) for 11 minutes. The resulting sol-gel was aged for at least 1 hour before coating. The sol-gel was forced into production tooling having shaped mold cavities of dimensions reported in Table 1 (below), wherein "NA" means not applicable. SAPA shaped alumina particles were prepared according to the disclosure of paragraph [0128] of U.S. Pat. Appln. Publ. No. 2010/0146867 (Boden et al.) using a draft angle of 98 degrees. Shaped Ceramic Abrasive Particles of the same general shape and composition as SAPB were prepared according to the disclosure of U.S. Pat. No. 8,142,531 (Adefris et al.)

TABLE 1

| SHAPED CERAMIC ABRASIVE PARTICLE | SHAPE, REPRESENTATIVE FIGURE | MAXIMUM STRAIGHT EDGE LENGTH, mm | NUMBER OF INWARDLY EXTENDING EDGES | INTERSECTION ANGLE WITH INWARDLY EXTENDING EDGE, degrees | DRAFT ANGLE ON ALL EDGES, degrees | PARTICLE MEDIAN THICKNESS, mm |
|---|---|---|---|---|---|---|
| SAP1 | triangular, FIG. 11 | 2.8 | 1 | 30 | 8 | 0.71 |
| SAP2 | triangular, FIG. 15 | 3.8 | 1 | 45 | 8 | 0.71 |
| SAP3 | triangular, FIG. 16 | 2.8 | 1 | 25 | 8 | 0.71 |
| SAP4 | square, FIG. 20B | 2.8 | 4 | 60 | 8 | 0.71 |
| SAP5 | triangular, smaller scale version of SAP1 | 1.3 | 1 | 30 | 8 | 0.33 |

TABLE 1-continued

| SHAPED CERAMIC ABRASIVE PARTICLE | SHAPE, REPRESENTATIVE FIGURE | MAXIMUM STRAIGHT EDGE LENGTH, mm | NUMBER OF INWARDLY EXTENDING EDGES | INTERSECTION ANGLE WITH INWARDLY EXTENDING EDGE, degrees | DRAFT ANGLE ON ALL EDGES, degrees | PARTICLE MEDIAN THICKNESS, mm |
|---|---|---|---|---|---|---|
| SAPA | triangular, FIG. 12 using a draft angle of 98 degrees | 2.8 | 0 | NA | 8 | 0.71 |
| SAPB | square, FIG. 20A | 2.8 | 0 | NA | 8 | 0.71 |
| SAPC | triangular smaller scale version of SAPA | 1.3 | 0 | NA | 8 | 0.33 |

A mold release agent, 1 percent peanut oil in methanol, was used with about 0.5 mg/in$^2$ (0.08 mg/cm$^2$) of peanut oil applied to the production tooling having an array of mold cavities. The excess methanol was removed by placing sheets of the production tooling in an air convection oven for 5 minutes at 45° C. The sol-gel was forced into the cavities with a putty knife so that the openings of the production tooling were completely filled. The sol-gel coated production tooling was placed in an air convection oven at 45° C. for at least 45 minutes to dry. The shaped ceramic precursor particles were removed from the production tooling by passing it over an ultrasonic horn. The shaped ceramic precursor particles were calcined at approximately 650° C. and then saturated with a with a mixed nitrate solution of MgO, Y$_2$O$_3$, CoO, and La$_2$O$_3$.

All of the shaped ceramic abrasive particles described in the Examples were treated to enhance electrostatic application of the shaped ceramic abrasive particles in a manner similar to the method used to make crushed abrasive particles disclosed in U.S. Pat. No. 5,352,254 (Celikkaya). The calcined, precursor shaped ceramic abrasive particles were impregnated with a rare earth oxide (REO) solution comprising 1.4 percent MgO, 1.7 percent Y$_2$O$_3$, 5.7 percent La$_2$O$_3$ and 0.07 percent CoO. Into 70 grams of the REO solution, 1.4 grams of HYDRAL COAT 5 0.5 micrometer particle size aluminum trihydroxide powder available from Almatis of Leetsdale, Pa., was dispersed by stirring it in an open beaker. About 100 grams of calcined, precursor shaped ceramic abrasive particles was then impregnated with the 71.4 grams of the HYDRAL COAT 5 powder dispersion in REO solution. The impregnated, calcined, precursor shaped ceramic abrasive particles were allowed to dry after which the particles were again calcined at 650° C. and sintered at approximately 1400° C. to final hardness. Both the calcining and sintering were carried out using rotary tube kilns under ambient atmosphere. The resulting composition was an alumina composition containing 1 weight percent MgO, 1.2 weight percent of Y$_2$O$_3$, 4 weight percent of La$_2$O$_3$ and 0.05 weight percent of CoO, with traces of TiO$_2$, SiO$_2$, and CaO.

General Procedure for Preparing Abrasive Discs

Abrasive articles were prepared from the abrasive particles prepared as described above and the coating compositions shown in Table 2. 7-inch (17.8 cm) diameter fiber discs with ⅞-inch (2.2-cm) diameter arbor holes of a vulcanized fiber backing having a thickness of 0.83 mm (33 mils) (obtained as DYNOS VULCANIZED FIBRE from DYNOS Gmbh, Troisdorf, Germany) were coated with 3.5 grams/disc of the make coat composition, electrostatically coated with 15.0 grams/disc of abrasive particles, and then 13.0 grams/disc of the size coat composition was applied. All of the discs that were used to grind stainless steel samples were further coated with 10 grams of supersize coat after partially curing the discs at 90° C. for 90 minutes. Following curing at 102° C. for 10 hours, the discs were flexed.

TABLE 2

| | | PARTS BY WEIGHT | | |
|---|---|---|---|---|
| MATERIAL | DESCRIPTION | MAKE | SIZE | SUPER-SIZE |
| Resole phenolic resin | metal hydroxide catalyzed phenol-formaldehyde resin, ca. 75 percent in water | 49.15 | 29.42 | none |
| Epoxy Resin | EPON 828 epoxy resin obtained from Momentive Specialty Chemicals, Columbus, Ohio | none | none | 30.96 |
| Water | Water | 10.19 | 18.12 | 11.52 |
| Filler | calcium carbonate having a particle size less than 46 micrometers and an average particle size of about 15 micrometers, obtained as GEORGIA MARBLE NO. 10 from Georgia Marble, Gantts Quarry, Alabama | 40.56 | none | none |
| Grinding aid | cryolite, obtained as RTN Cryolite from TR International Trading Co., Houston, Texas | none | 50.65 | none |
| Grinding aid | Potassium tetrafluoroborate obtained from Solvay Fluorides LLC, Houston, Texas | none | none | 56.34 |
| Surfactant | 0.5 percent ethoxylated oleic acid surfactant, obtained as EMULON A from BASF Corp., Mount Olive, New Jersey | 0.10 | 1.81 | none |
| Surfactant | AEROSOL OT-NV surfactant obtained from Cytec Industries, Woodland Park, New jersey | none | none | 0.78 |
| Curing agent | IMICURE EMI 24 curing agent obtained from Air Products and Chemicals, Allentown, Pennsylvania | none | none | 0.36 |
| Anti-foam | ANTIFOAM 1430 anti-foaming agent obtained from Dow Corning Corporation, Midland, Michigan | none | none | 0.04 |

Abrasion Test

The abrasive discs were tested using the following procedure. Abrasive discs (7-inch (17.8 cm) diameter) for evaluation were attached to a rotary grinder fitted with a 7-inch (17.8 cm) ribbed disc pad face plate 80514 EXTRA HARD RED, obtained from 3M Company, St. Paul, Minn.). The grinder was then activated and urged against an end face of a 0.75×0.75 in (1.9×1.9 cm) pre-weighed 1045 carbon steel (or alternatively, 304 stainless steel) bar under a load of 12 lb (4.5 kg). The rotational speed of the disc pad face plate under the above load condition against the workpiece was maintained at 5000 rpm. The workpiece was abraded under these conditions for a total of fifty (50) 10-second grinding intervals (cycles). Following each 10-second cycle, the workpiece was allowed to cool to room temperature and weighed to determine the cut of the abrasive operation. Test results were reported as cut rate, incremental cut, and/or cumulated cut vs. number of cycles.

Example 1 and Comparative Examples A-B

Example 1 and Comparative Examples A and B demonstrate the effect of abrasive articles comprising the particles of the present disclosure when compared to abrasive articles comprising previously-known abrasive particles.

Example 1 was prepared according to the general procedure for preparing abrasive discs using SAP1 abrasive particles.

Comparative Example A was a 7-inch (17.8-cm) diameter fiber disc with a ⅞ inch (2.2 cm) hole made with SAPA and is commercially available as "CUBITRON II FIBER DISC 982C, 36+" from 3M, Saint Paul, Minn.

Comparative Example B was a 7-inch (17.8-cm) diameter fiber disc with a ⅞ inch (2.2 cm) hole made with conventionally crushed 3M Ceramic Abrasive Grain and is commercially available as "988C" from 3M, Saint Paul, Minn.

Figure 13:
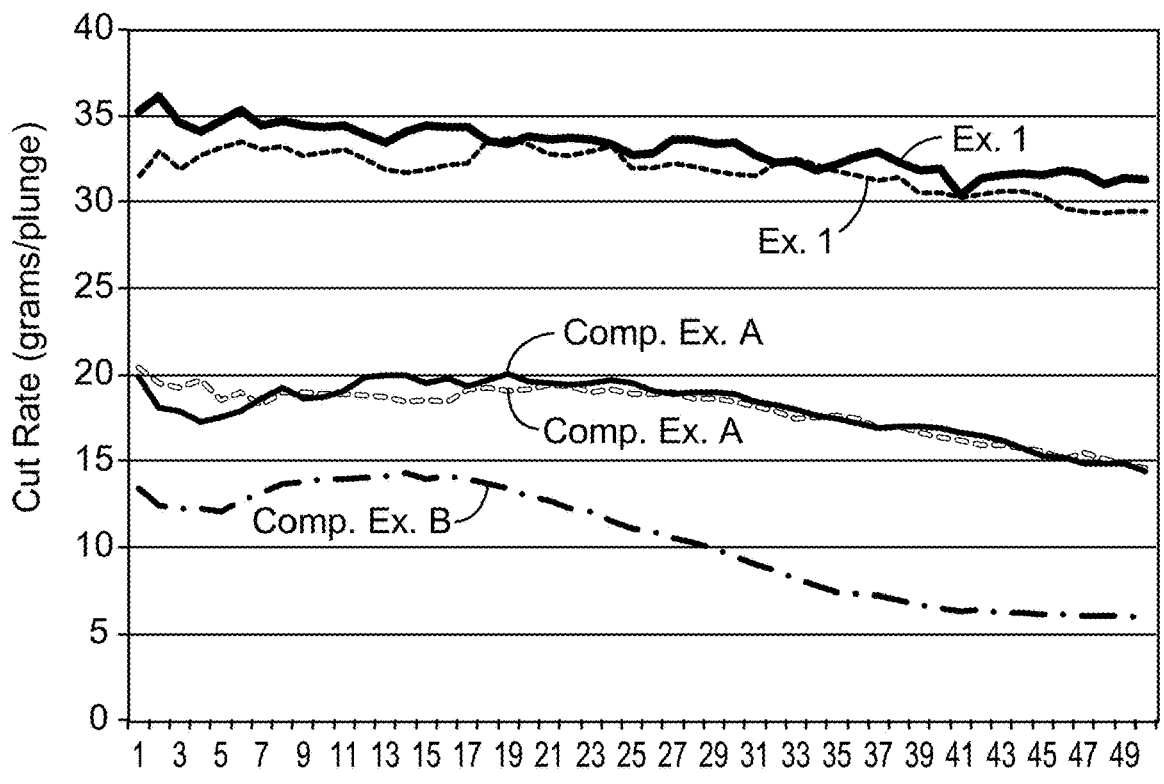
FIGS. 13 and 14 are plots comparing cut rate and cumulative cut for abrasive discs of Example 1 and Comparative Examples A and B.
Figure 14:
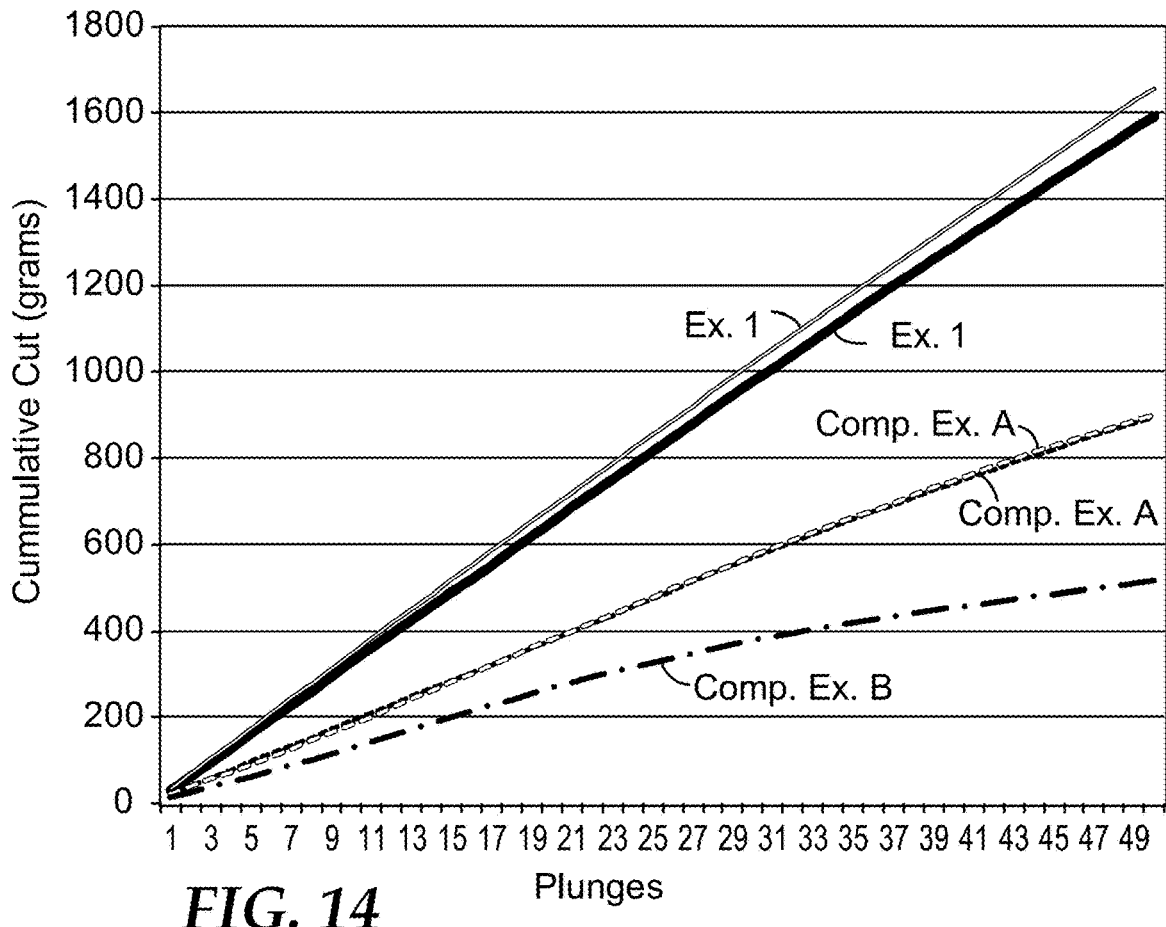

Abrasive discs according to Example 1 and Comparative Examples A and B were tested according to the Abrasion Test. The comparative cut rate and cumulative cut data are shown in FIGS. 13 and 14, wherein the coated abrasive of Example 1 exhibited cut that was at least 60 percent better than Comparative Example A (a comparable shaped ceramic abrasive particle with straight edges), and more than twice as good as comparable the crushed ceramic grain of Comparative Example B.

Examples 2-6 and Comparative Example C

Examples 2-6 were prepared to compare with Example 1 to demonstrate the effects of changing the intersecting angle created by a inwardly extending edge with another edge.

Example 2 was prepared identically to Example 1 with the exception that the abrasive particles were SAP2 instead of SAP1.

Example 3 was prepared identically to Example 1 with the exception that the abrasive particles were SAP3 instead of SAP1.

Example 4 was prepared identically to Example 1 with the exception that a supersize coating was applied.

Example 5 was prepared identically to Example 2 with the exception that a supersize coating was applied.

Example 6 was prepared identically to Example 3 with the exception that a supersize coating was applied.

Comparative Example C was prepared identically to Example 1, with the exception that the abrasive particles were SAPA instead of SAP1.

Comparative Example D was prepared identically to Comparative Example C, with the exception that a supersize coating was applied.

Figure 17:
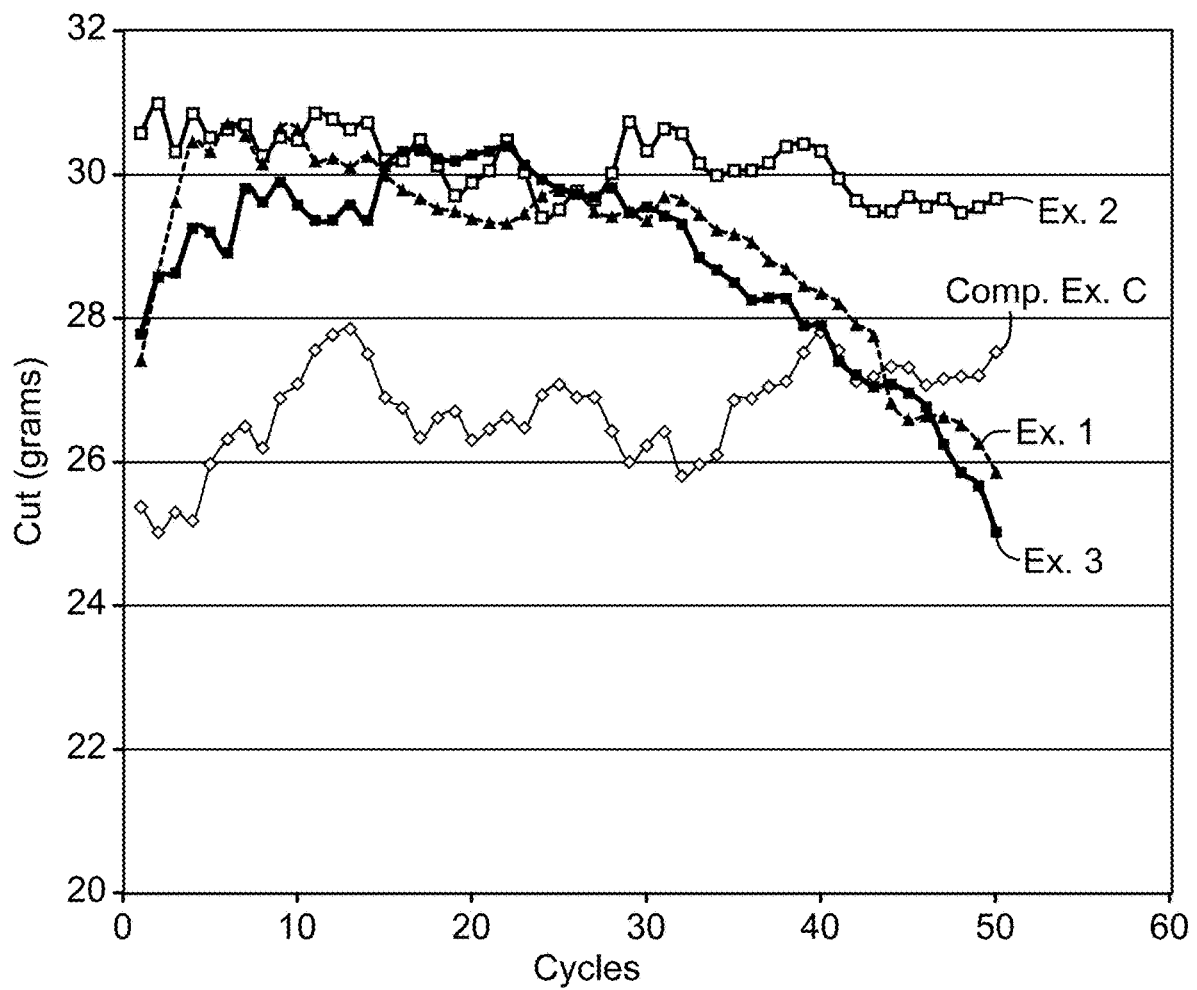
FIG. 17 is a plot comparing the performance of discs made with particles from Example 1, Example 2, Example 3, and Comparative Example C on 1045 Carbon Steel.

Examples 1, 2, and 3 were tested according to the Abrasion Test. FIG. 17 shows the comparison of the performance of discs made with particles from Example 1, Example 2, Example 3, and Comparative Example C on 1045 Carbon Steel. The initial cut rates of all the discs made with particles having and inwardly extending (concave) wall were higher than those discs made with particles with straight edges. The disc of Example 2 performed the best. It maintained a higher cut rate throughout the test.

Figure 18:
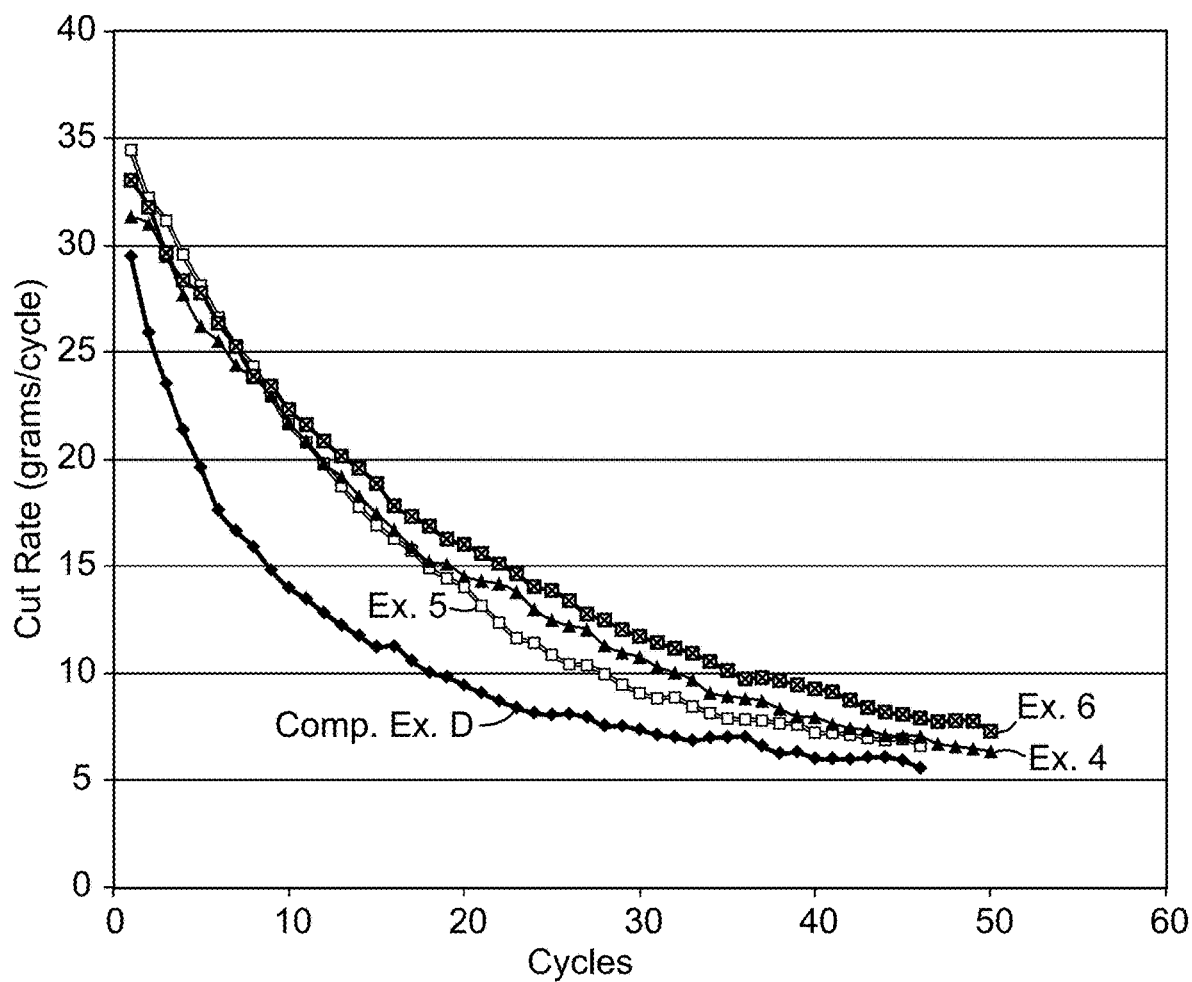
FIG. 18 is a plot comparing the performance of discs of Example 4, Example 5, Example 6, and Comparative Example D when used to abrade 304 Stainless Steel.
Figure 19:
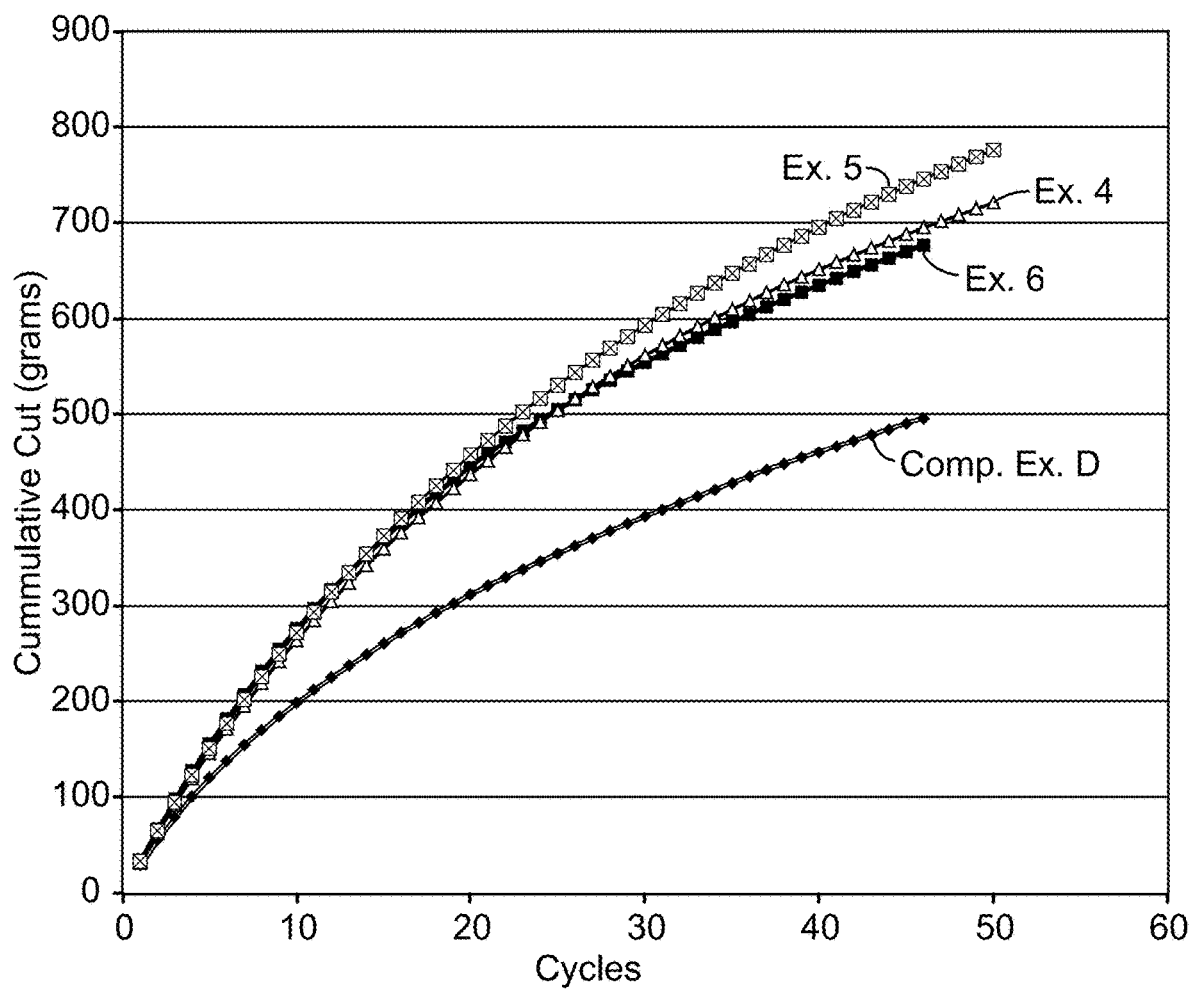
FIG. 19 is a plot comparing of the performance of discs of Example 4, Example 5, Example 6, and Comparative Example D.

FIG. 18 shows the comparison of the performance of discs of Example 4, Example 5, Example 6, and Comparative Example D when used to abrade 304 Stainless Steel. The initial cut rates of all the discs made with particles that were supplied with concavities were higher than those discs made with conventional particles. Particularly the Example 6 disc made with SAP3 particles performed the best. It maintained higher cut rate than Comparative Example D as well as the other Example discs throughout the test. This higher performance can be demonstrated better as cumulative cut as a function of number of cycles as shown in FIG. 19.

Example 7 and Comparative Example E

Example 7 and Comparative Example E are abrasive articles that demonstrate the effects of an alternative embodiment of the inventive particle when compared to similar particles having straight edges, and also with conventional crushed ceramic abrasive grain and is commercially available as 321 3M Ceramic Abrasive Grain 321 from 3M, Saint Paul, Minn.

Example 7 was made identically to Example 1 with the exception that SAP4 was substituted for SAP1.

Comparative Example E was made identically to Example 1 with the exception that SAPB was substituted for SAP1.

Comparative Example F was made identically to Example 1 with the exception that "3M Ceramic Abrasive Grain 321" (3M, Saint Paul, Minn.) was substituted for SAP1.

Example 7 and Comparative Examples E and F were tested according to the Abrasion Test on 1045 carbon steel. The test results are shown in FIG. 21, again show that including an inwardly extending (e.g., concave) region in shaped ceramic abrasive particles transforms poorer-performing shaped particles into better-performing particles when compared to conventionally-crushed particles in abrasive disc articles.

Example 8 and Comparative Example G

Examples 8 and Comparative Example G demonstrate the effect of abrasive articles comprising yet another embodiment of the particles of the present disclosure when compared to abrasive articles comprising previously-known abrasive particles. Example 8 was prepared according to the general procedure for preparing abrasive discs using SAP5 abrasive particles. Comparative Example G was prepared identically to Example 1 with the exception that the abrasive particles were SAPC instead of SAP1 and the discs were coated with 2.5 grams/disc of the make coat composition, electrostatically coated with 5.5 grams/disc of abrasive particles, and then 6.0 grams/disc of the size coat and 6.0 grams of the supersize coat composition was applied.

Figure 22:
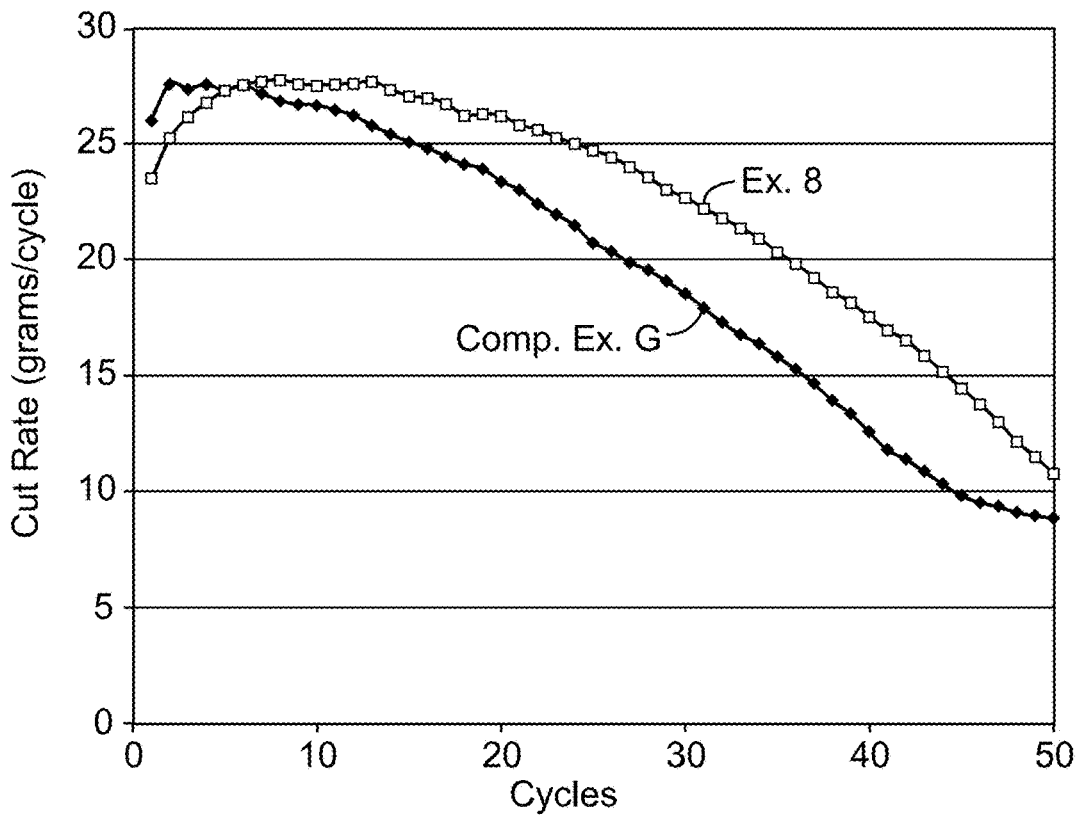
FIGS. 22 and 23 are plots comparing the performance of discs of Example 8 and Comparative Example G when used to abrade 1045 carbon steel and 304 Stainless Steel, respectively.
Figure 23:
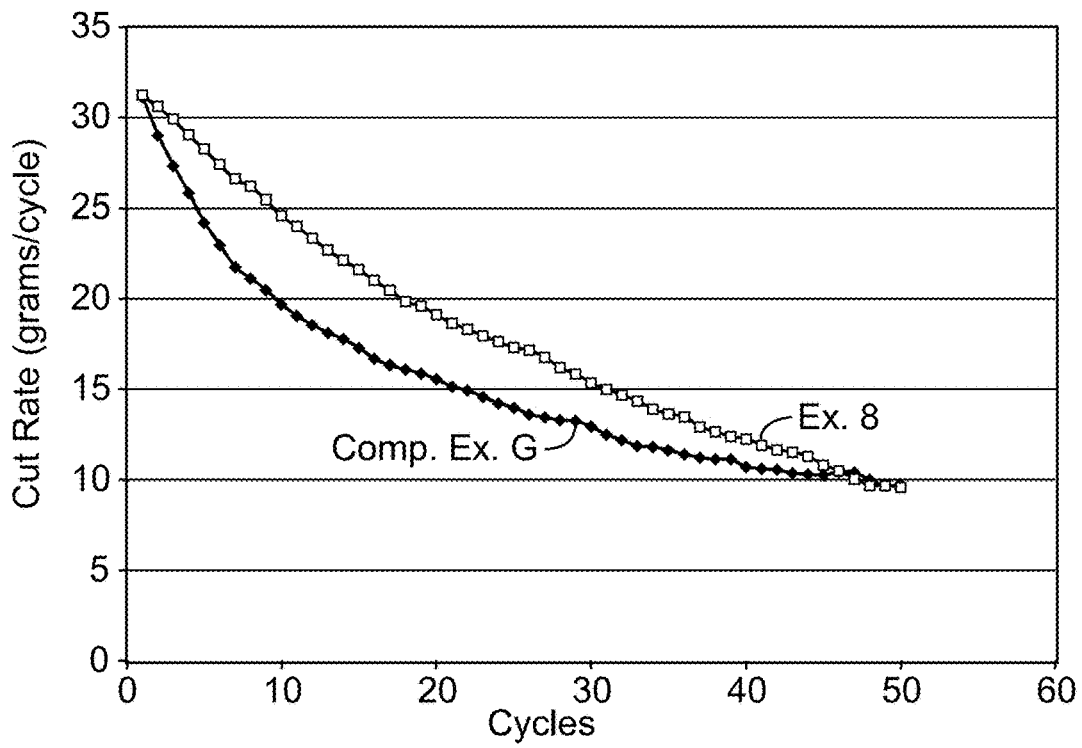

Example 8 and Comparative Example G were tested according to the Abrasion Test on 1045 carbon steel and 304 stainless steel. The comparative cut rate data are shown in FIG. 22 for carbon steel and FIG. 23 for stainless steel.

All patents and publications referred to herein are hereby incorporated by reference in their entirety. All examples given herein are to be considered non-limiting unless otherwise indicated. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A method of making shaped ceramic abrasive particles, the method comprising steps:
    a) providing a mold defining a mold cavity, wherein the mold cavity has an outer opening defined by a perimeter having a generally triangular shape, wherein the perimeter comprises first, second, and third inwardly extending regions,
    wherein the first region terminates at a first corner and a second corner, the second region terminates at the second corner and a third corner, and the third region terminates at the first corner and the third corner, wherein the first, second, and third corners define first, second, and third acute interior angles,
    wherein the first, second, and third acute interior angles are in a range from 20 degrees to 50 degrees, and wherein either:
        (i) each of the first, second, and third inwardly extending regions comprises a curved edge; or
        (iii) each of the first, second, and third inwardly extending regions comprises two substantially straight edges;
    wherein the mold cavity is laterally bounded by a peripheral mold surface comprising a first mold wall that intersects the perimeter at the first region, a second mold wall that intersects the perimeter at the second region, and a third mold wall that intersects the perimeter at the third region;
    b) disposing a ceramic precursor material within the mold cavity;
    c) converting the ceramic precursor material disposed within the mold cavity into a shaped ceramic precursor particle; and
    d) converting the shaped ceramic precursor particle into the shaped ceramic abrasive particle.

2. The method of claim 1, wherein each of the first, second, and third inwardly extending regions comprises a curved edge and the curved edge is a monotonic curve.

3. The method of claim 1, wherein the method further comprises separating the shaped ceramic precursor particle from the mold prior to step d).

4. The method of claim 1, wherein step d) comprises sintering the shaped ceramic precursor particle.

5. The method of claim 4, wherein step d) comprises calcining the shaped ceramic precursor particle to provide a calcined shaped ceramic precursor particle, and sintering the calcined shaped ceramic precursor particle.

6. The method of claim 1, wherein the shaped ceramic abrasive particle comprises alpha alumina.

7. The method of claim 1, wherein the ceramic precursor material comprises a sol-gel.

8. The method of claim 1, wherein the ceramic precursor material comprises an alpha alumina precursor.

9. The method of claim 1, wherein each mold cavity has a maximum lateral dimension of less than or equal to one centimeter.

10. The method of claim 1, wherein each of the shaped ceramic abrasive particles has a thickness that is less than or equal to one-third of its width.

11. The method of claim 1, wherein the first, second, and third acute interior angles are in a range from 35 degrees to 50 degrees.

12. A method of making shaped ceramic abrasive particles, the method comprising steps:
    a) providing a mold defining a mold cavity, wherein the mold cavity has an outer opening defined by a perimeter having a generally triangular shape, wherein the perimeter comprises first, second, and third edges;
    wherein the first edge terminates at a first corner and a second corner, the second edge terminates at the second corner and a third corner, and the third edges terminates at the first corner and the third corner, wherein the first, second, and third corners define first, second, and third acute interior angles;
    wherein the first, second, and third edges comprise inwardly extending curved edges, and wherein the first, second, and third acute interior angles are in a range from 20 degrees to 50 degrees;
    wherein the mold cavity is laterally bounded by a peripheral mold surface comprising a first mold wall that intersects the perimeter at the first edge, a second mold wall that intersects the perimeter at the second edge, and a third mold wall that intersects the perimeter at the third edge, wherein the mold further comprises a bottom mold surface in contact with the first, second, and third mold walls, wherein the mold cavity has a depth;
    b) disposing a ceramic precursor material within the mold cavity;
    c) converting the ceramic precursor material disposed within the mold cavity into a shaped ceramic precursor particle; and
    d) converting the shaped ceramic precursor particle into the shaped ceramic abrasive particle.

13. The method of claim 12, wherein the inwardly extending curved edges of the first, second, and third edges of the perimeter are monotonic curves.

* * * * *